US010450494B2

(12) United States Patent
Pernites et al.

(10) Patent No.: US 10,450,494 B2
(45) Date of Patent: Oct. 22, 2019

(54) CEMENT SLURRIES FOR WELL BORES

(71) Applicant: BJ Services, LLC, Tomball, TX (US)

(72) Inventors: Roderick B. Pernites, Spring, TX (US); Felipe Padilla Florencia, Spring, TX (US); Jordan Lee Clark, Tomball, TX (US); Angel Gonzalez, Katy, TX (US)

(73) Assignee: BJ Services, LLC, Tomball, TX (US)

( * ) Notice: Subject to any disclaimer, the term of this patent is extended or adjusted under 35 U.S.C. 154(b) by 0 days.

(21) Appl. No.: 15/873,053

(22) Filed: Jan. 17, 2018

(65) Prior Publication Data

US 2019/0218445 A1 Jul. 18, 2019

(51) Int. Cl.
C09K 8/487 (2006.01)
C04B 28/04 (2006.01)
C04B 103/00 (2006.01)

(52) U.S. Cl.
CPC .............. C09K 8/487 (2013.01); C04B 28/04 (2013.01); C04B 2103/0031 (2013.01); C04B 2103/0036 (2013.01)

(58) Field of Classification Search
CPC ............ C04B 28/04; C04B 2103/0036; C04B 2103/0031; C09K 8/487
See application file for complete search history.

(56) References Cited

U.S. PATENT DOCUMENTS

| | | |
|---|---|---|
| 2,094,316 A | 9/1937 | Cross et al. |
| 2,793,957 A | 5/1957 | Mangold et al. |
| 2,800,963 A | 7/1957 | Roberts et al. |
| 2,852,402 A | 9/1958 | Shell |
| 2,861,636 A | 11/1958 | Messenger |
| 2,880,096 A | 5/1959 | Hurley |
| 2,913,050 A | 11/1959 | Crawford |
| 2,945,769 A | 7/1960 | Gama et al. |
| 2,985,239 A | 5/1961 | Shell |
| 2,987,416 A | 6/1961 | Wessel |
| 3,028,913 A | 4/1962 | Armentrout |
| 3,036,633 A | 5/1962 | Mayhew |
| 3,219,111 A | 11/1965 | Armentrout |
| 3,220,863 A | 11/1965 | Mayhew |
| 3,232,777 A | 2/1966 | Bush |
| 3,363,689 A | 1/1968 | Smith et al. |
| 3,421,584 A | 1/1969 | Eilers et al. |
| 3,465,825 A | 9/1969 | Hook et al. |
| 3,499,491 A | 3/1970 | Wyant et al. |
| 3,502,149 A | 3/1970 | Pence, Jr. |
| 3,557,876 A | 1/1971 | Tragesser |
| 3,841,886 A | 10/1974 | Burr |
| 3,866,683 A | 2/1975 | Maley et al. |
| 3,876,005 A | 4/1975 | Fincher et al. |
| 4,069,870 A | 1/1978 | Gallus |
| 4,114,692 A | 9/1978 | Gallus |
| 4,144,077 A | 3/1979 | Gallus |
| 4,259,824 A | 4/1981 | Lopez |
| 4,482,383 A | 11/1984 | McKenzie |
| 4,963,191 A | 10/1990 | LaFleur |
| 4,963,668 A | 10/1990 | Allen et al. |
| 5,004,506 A | 4/1991 | Allen et al. |
| 5,017,232 A | 5/1991 | Miceli |
| 5,169,566 A | 12/1992 | Stucky et al. |
| 5,223,035 A | 6/1993 | Hopkins et al. |
| 5,228,914 A | 7/1993 | Miceli |
| 5,292,366 A | 3/1994 | Miceli |
| 5,320,172 A | 6/1994 | Jennings, Jr. |
| 5,346,012 A | 9/1994 | Heathman et al. |
| 5,358,676 A | 10/1994 | Jennings et al. |
| 5,402,849 A | 4/1995 | Jennings, Jr. |
| 5,452,764 A | 9/1995 | Jennings, Jr. |
| 5,505,987 A | 4/1996 | Jennings et al. |
| 5,507,345 A | 4/1996 | Wehunt, Jr. et al. |
| 5,571,319 A | 11/1996 | Berke et al. |
| 5,622,558 A | 4/1997 | Berke et al. |
| 5,635,292 A | 6/1997 | Jennings et al. |
| 5,654,048 A | 8/1997 | Andersen et al. |
| 5,695,811 A | 12/1997 | Andersen et al. |
| 5,968,257 A * | 10/1999 | Ahrens ................. C04B 20/008 106/672 |
| 6,106,603 A | 8/2000 | Skaggs et al. |
| 6,117,226 A | 9/2000 | Dial et al. |
| 6,221,152 B1 | 4/2001 | Dial et al. |
| 6,241,815 B1 | 6/2001 | Bonen |
| 6,309,455 B1 | 10/2001 | Skaggs et al. |
| 6,402,830 B1 | 6/2002 | Schaffer |
| 6,516,883 B1 | 2/2003 | Chatterji et al. |
| 6,601,647 B2 | 8/2003 | Brothers et al. |
| 6,631,766 B2 | 10/2003 | Brothers et al. |
| 6,645,289 B2 | 11/2003 | Sobolev et al. |
| 6,648,961 B2 | 11/2003 | Brothers et al. |
| 6,660,078 B2 | 12/2003 | Brothers et al. |
| 6,817,238 B2 | 11/2004 | Go Boncan et al. |
| 6,869,474 B2 | 3/2005 | Perez-Pena et al. |
| 6,913,819 B2 | 7/2005 | Wallner |
| 6,979,366 B2 | 12/2005 | Chatterji et al. |
| 6,989,057 B2 | 1/2006 | Getzlaf et al. |
| 7,284,608 B2 | 10/2007 | Reddy et al. |
| 7,353,870 B2 | 4/2008 | Roddy et al. |
| 7,407,545 B2 | 8/2008 | Wallner |
| 7,426,961 B2 | 9/2008 | Stephenson et al. |
| 7,445,669 B2 | 11/2008 | Roddy et al. |
| 7,478,675 B2 | 1/2009 | Roddy et al. |
| 7,559,367 B2 | 7/2009 | Roddy et al. |
| 7,607,482 B2 | 10/2009 | Roddy et al. |

(Continued)

OTHER PUBLICATIONS

Broni-Bediako, E., et al., *Oil Well Cement Additives: A Review of the Common Types*, Oil and Gas Research vol. 2, Issue 2 (2016).

(Continued)

Primary Examiner — Anthony J Green
(74) Attorney, Agent, or Firm — Keith B. Willhelm

(57) ABSTRACT

Cement slurries are provided for use in cementing oil and gas wells. The cement slurry comprises API Class C or Class H Portland cement and a pozzolan selected from the group consisting of pumice and mixtures of pumice and fly ash. Pumice is present in the mixtures in amounts at least about 40 wt % of the pozzolan. The weight ratio of the pozzolan to the cement is from about 35:65 to about 70:30. The novel cement slurries preferably will not comprise any additional lime, including hydrated lime, or other activators.

25 Claims, 21 Drawing Sheets

(56) References Cited

U.S. PATENT DOCUMENTS

| | | |
|---|---|---|
| 7,607,484 B2 | 10/2009 | Roddy et al. |
| 7,612,021 B2 | 11/2009 | Chatterji et al. |
| 7,617,870 B1 | 11/2009 | Roddy et al. |
| 7,631,692 B2 | 12/2009 | Roddy et al. |
| 7,670,427 B2 | 3/2010 | Perez-Pena et al. |
| 7,674,332 B2 | 3/2010 | Roddy et al. |
| 7,713,918 B2 | 5/2010 | Stephenson et al. |
| 7,740,700 B2 | 6/2010 | Wallner |
| 7,743,828 B2 | 6/2010 | Roddy et al. |
| 7,784,542 B2 | 8/2010 | Roddy et al. |
| 7,789,150 B2 | 9/2010 | Roddy et al. |
| 7,794,537 B2 | 9/2010 | Barlet-Gouedard et al. |
| 7,799,128 B2 | 9/2010 | Guynn et al. |
| 7,806,183 B2 | 10/2010 | Roddy et al. |
| 7,861,780 B2 | 1/2011 | Stephenson et al. |
| 7,867,954 B2 | 1/2011 | Warrender et al. |
| 7,892,352 B2 | 2/2011 | Roddy et al. |
| 7,927,419 B2 | 4/2011 | Roddy et al. |
| 7,972,432 B2 | 7/2011 | Guynn et al. |
| 7,998,907 B2 | 8/2011 | Stephenson et al. |
| 8,030,253 B2 | 10/2011 | Roddy et al. |
| 8,038,790 B1 | 10/2011 | Dubey et al. |
| 8,070,878 B2 | 12/2011 | Dubey |
| 8,182,605 B2 | 5/2012 | Wallner |
| 8,183,186 B2 | 5/2012 | Luo et al. |
| 8,226,879 B2 | 7/2012 | Genolet et al. |
| 8,261,827 B2 | 9/2012 | Roddy et al. |
| 8,268,072 B2 | 9/2012 | Mahmoudkhani et al. |
| 8,281,859 B2 | 10/2012 | Roddy et al. |
| 8,297,357 B2 | 10/2012 | Brenneis et al. |
| 8,298,332 B2 | 10/2012 | Dubey |
| 8,307,899 B2 | 11/2012 | Brenneis et al. |
| 8,318,642 B2 | 11/2012 | Roddy et al. |
| 8,323,399 B2 | 12/2012 | Guynn et al. |
| 8,324,137 B2 | 12/2012 | Roddy et al. |
| 8,327,939 B2 | 12/2012 | Roddy et al. |
| 8,333,240 B2 | 12/2012 | Roddy et al. |
| 8,394,744 B2 | 3/2013 | Woytowich et al. |
| 8,399,387 B2 | 3/2013 | Roddy et al. |
| 8,403,045 B2 | 3/2013 | Brenneis et al. |
| 8,424,598 B2 | 4/2013 | Roddy |
| 8,434,553 B2 | 5/2013 | Brenneis et al. |
| 8,440,596 B2 | 5/2013 | Brenneis et al. |
| 8,450,391 B2 | 5/2013 | Roddy et al. |
| 8,486,868 B2 | 7/2013 | Brenneis et al. |
| 8,486,869 B2 | 7/2013 | Brenneis et al. |
| 8,505,630 B2 | 8/2013 | Chatterji et al. |
| 8,506,837 B2 | 8/2013 | Ocalan et al. |
| 8,513,330 B2 | 8/2013 | Roddy et al. |
| 8,544,543 B2 | 10/2013 | Chatterji et al. |
| 8,557,036 B1 | 10/2013 | Chatterji et al. |
| 8,586,512 B2 | 11/2013 | Roddy et al. |
| 8,596,363 B1 | 12/2013 | Mahmoudkhani et al. |
| 8,598,093 B2 | 12/2013 | Roddy et al. |
| 8,627,888 B2 | 1/2014 | Santra et al. |
| 8,641,818 B2 | 2/2014 | Roddy |
| 8,672,028 B2 | 3/2014 | Karcher et al. |
| 8,691,737 B2 | 4/2014 | Chatterji et al. |
| 8,733,440 B2 | 5/2014 | Roddy |
| 8,741,057 B1 | 6/2014 | Chatterji et al. |
| 8,851,173 B2 | 10/2014 | Brothers et al. |
| 8,858,704 B2 | 10/2014 | Woytowich et al. |
| 8,877,831 B2 | 11/2014 | Roddy et al. |
| 8,895,485 B2 | 11/2014 | Roddy et al. |
| 8,895,486 B2 | 11/2014 | Roddy et al. |
| 8,895,487 B2 | 11/2014 | Patil et al. |
| 8,899,329 B2 | 12/2014 | Chatterji et al. |
| 8,906,155 B2 | 12/2014 | Gasafi et al. |
| 8,910,708 B2 | 12/2014 | Chatterji et al. |
| 8,944,165 B2 | 2/2015 | Patil et al. |
| 8,950,486 B2 | 2/2015 | Benkley et al. |
| 9,006,155 B2 | 4/2015 | Roddy et al. |
| 9,023,150 B2 | 5/2015 | Brenneis et al. |
| 9,038,722 B2 | 5/2015 | Patil et al. |
| 9,051,505 B2 | 6/2015 | Roddy et al. |
| 9,126,865 B2 | 9/2015 | Blackstock et al. |
| 9,150,773 B2 | 10/2015 | Chatterji et al. |
| 9,157,020 B2 | 10/2015 | Chatterji et al. |
| 9,206,344 B2 | 12/2015 | Roddy et al. |
| 9,212,534 B2 | 12/2015 | Ballew et al. |
| 9,227,872 B2 | 1/2016 | Pisklak et al. |
| 9,255,031 B2 | 2/2016 | Pisklak et al. |
| 9,255,454 B2 | 2/2016 | Lewis et al. |
| 9,260,343 B2 | 2/2016 | Brothers et al. |
| 9,284,224 B2 | 3/2016 | Muthusamy et al. |
| 9,328,281 B2 | 5/2016 | Agapiou et al. |
| 9,328,583 B2 | 5/2016 | Pisklak et al. |
| 9,346,711 B2 | 5/2016 | Chatterji et al. |
| 9,359,254 B2 | 6/2016 | Vorderbruggen et al. |
| 9,371,712 B2 | 6/2016 | Boul et al. |
| 9,376,609 B2 | 6/2016 | Karcher et al. |
| 9,394,202 B2 | 7/2016 | Porcherie et al. |
| 9,499,731 B2 | 11/2016 | Karcher et al. |
| 9,505,972 B2 | 11/2016 | Iverson et al. |
| 9,512,345 B2 | 12/2016 | Lende et al. |
| 9,512,346 B2 | 12/2016 | Roddy |
| 9,528,338 B2 | 12/2016 | Hall |
| 9,534,165 B2 | 1/2017 | Agapiou et al. |
| 9,550,933 B2 | 1/2017 | Chatterji et al. |
| 9,550,934 B2 | 1/2017 | Karcher et al. |
| 9,561,983 B2 | 2/2017 | Thomas et al. |
| 9,573,849 B2 | 2/2017 | Purchell, Jr. et al. |
| 9,580,637 B2 | 2/2017 | Gordon et al. |
| 9,580,638 B2 | 2/2017 | Boul et al. |
| 9,611,174 B2 | 4/2017 | Thomas et al. |
| 9,624,419 B2 | 4/2017 | Khammar et al. |
| 9,676,989 B2 | 6/2017 | Brenneis et al. |
| 2004/0149170 A1 | 8/2004 | Moran |
| 2010/0041792 A1* | 2/2010 | Roddy ................ C04B 28/02 523/130 |
| 2010/0230164 A1 | 9/2010 | Pomerleau |
| 2010/0230169 A1 | 9/2010 | Pomerleau |
| 2011/0056411 A1 | 3/2011 | Schmidt et al. |
| 2011/0073311 A1 | 3/2011 | Porcherie et al. |
| 2012/0204764 A1 | 8/2012 | Weaver et al. |
| 2012/0247766 A1 | 10/2012 | Hemmings |
| 2012/0255733 A1 | 11/2012 | Genolet et al. |
| 2012/0322698 A1 | 12/2012 | Dealy et al. |
| 2013/0150267 A1 | 6/2013 | Roddy |
| 2013/0319672 A1 | 12/2013 | Reddy et al. |
| 2014/0034313 A1 | 2/2014 | Pisklak et al. |
| 2014/0034314 A1 | 2/2014 | Lewis et al. |
| 2014/0087974 A1 | 3/2014 | Villareal et al. |
| 2014/0123879 A1* | 5/2014 | Karcher ................ C04B 28/02 106/692 |
| 2014/0144633 A1 | 5/2014 | Nguyen et al. |
| 2014/0144634 A1 | 5/2014 | Nguyen et al. |
| 2014/0144635 A1 | 5/2014 | Nguyen et al. |
| 2014/0318419 A1 | 10/2014 | Chatterji et al. |
| 2014/0318764 A1 | 10/2014 | Chatterji et al. |
| 2014/0326455 A1 | 11/2014 | Ravi et al. |
| 2014/0367105 A1 | 12/2014 | Karcher et al. |
| 2014/0373756 A1 | 12/2014 | Brothers et al. |
| 2014/0374097 A1 | 12/2014 | Morgan et al. |
| 2015/0033989 A1 | 2/2015 | Perez-Pena |
| 2015/0152314 A1 | 6/2015 | Muthusamy et al. |
| 2015/0175481 A1 | 6/2015 | Pisklak et al. |
| 2015/0175869 A1 | 6/2015 | Agapiou et al. |
| 2015/0175870 A1 | 6/2015 | Patil et al. |
| 2015/0197033 A1 | 7/2015 | Agapiou et al. |
| 2015/0197453 A1 | 7/2015 | Pisklak et al. |
| 2015/0247383 A1 | 9/2015 | Chatterji et al. |
| 2015/0284621 A1 | 10/2015 | Marchesini et al. |
| 2015/0315875 A1 | 11/2015 | Chatterji et al. |
| 2015/0337194 A1 | 11/2015 | Ballard |
| 2015/0361760 A1 | 12/2015 | McClung, III |
| 2015/0369019 A1 | 12/2015 | Rafen |
| 2016/0017688 A1 | 1/2016 | Chatterji et al. |
| 2016/0053158 A1 | 2/2016 | Roddy et al. |
| 2016/0075933 A1 | 3/2016 | Pisklak et al. |
| 2016/0076349 A1 | 3/2016 | Dous et al. |
| 2016/0084037 A1 | 3/2016 | Brothers et al. |
| 2016/0115366 A1 | 4/2016 | Maxson et al. |
| 2016/0153260 A1 | 6/2016 | Brothers et al. |

(56) References Cited

U.S. PATENT DOCUMENTS

| | | |
|---|---|---|
| 2016/0160109 A1 | 6/2016 | Patil et al. |
| 2016/0177167 A1 | 6/2016 | Hundt et al. |
| 2016/0186036 A1 | 6/2016 | Pisklak et al. |
| 2016/0194545 A1 | 7/2016 | Pisklak et al. |
| 2016/0200959 A1 | 7/2016 | Vorderbruggen et al. |
| 2016/0214900 A1 | 7/2016 | Pisklak et al. |
| 2016/0214901 A1 | 7/2016 | Muthusamy et al. |
| 2016/0222276 A1 | 8/2016 | Agapiou et al. |
| 2016/0244656 A1 | 8/2016 | Chatterji et al. |
| 2016/0258269 A1 | 9/2016 | Musso et al. |
| 2016/0264840 A1 | 9/2016 | Nelson |
| 2016/0280982 A1 | 9/2016 | Boul et al. |
| 2016/0289531 A1 | 10/2016 | Agapiou et al. |
| 2016/0289533 A1 | 10/2016 | Agapiou et al. |
| 2016/0298016 A1 | 10/2016 | Agapiou et al. |
| 2016/0369152 A1 | 12/2016 | Lende et al. |
| 2017/0001911 A1 | 1/2017 | Pisklak et al. |
| 2017/0009122 A1 | 1/2017 | Funkhouser et al. |
| 2017/0029689 A1 | 2/2017 | Wilson et al. |
| 2017/0036956 A1 | 2/2017 | Karcher et al. |
| 2017/0036959 A1 | 2/2017 | Iverson et al. |
| 2017/0073273 A1 | 3/2017 | Agapiou et al. |
| 2017/0073568 A1 | 3/2017 | Roddy et al. |
| 2017/0114266 A1 | 4/2017 | Bryant et al. |
| 2017/0130115 A1 | 5/2017 | Ballard |
| 2017/0130117 A1 | 5/2017 | Gordon et al. |
| 2017/0130118 A1 | 5/2017 | Gordon et al. |
| 2017/0130119 A1 | 5/2017 | Boul et al. |
| 2017/0145285 A1 | 5/2017 | Lafitte et al. |
| 2017/0158559 A1 | 6/2017 | Thomas et al. |
| 2017/0183556 A1 | 6/2017 | Agapiou et al. |
| 2017/0183558 A1 | 6/2017 | Funkhouser et al. |

OTHER PUBLICATIONS

CR Minerals, *Safety Data Sheet—CR Minerals Pozzolan Tephra NP, Tephra WP, Tephra UF* (undated).

CR Minerals, *Safety Data Sheet—CR Minerals: Tephra RFA* (undated).

CR Minerals, *Tephra Pozzolan* (undated).

CR Minerals, *Tephra®* (undated).

CR Minerals, *Tephra® RFA* (undated).

Goboncan, V., et al., *Real-Time Cement Expansion/Shrinkage Testing Under Downhole Conditions for Enhanced Annular Isolation*, SPC/IADC Drilling Conference No. 79911 (2003).

Hess Pumice Products, *Hess Pumice Fact Sheet* (Rev. E—Oct. 5, 2016).

Hess Pumice Products, *The Ideal Alternative, Pumice instead of Fly Ash* (undated).

Hess Pumice Products, *Typical Technical Properties ( Pumice)* (undated).

Lavrov, A., et al., *Physics and Mechanics of Primary Well Cementing; Chapter 2—Properties of Well Cement* (Springer 2016).

Michaux, M., et al., *Cement Chemistry and Additives*, Oilfield Review vol. 1, No. 1 pp. 18-25 (undated).

Piot, B., *Cement and Cementing: An Old Technique With a Future?*, (undated).

Schultz, J., et al., *Hard and Fast—The Cement Challenge*, Middle East Reservoir Review (Nov. 2, 2001).

Unknown, *Chapter 3: Cementing* (undated).

\* cited by examiner

Class C Cement Slurry Compositions

| Fluid | Density (ppg) | Cement | Pozzolan | Pozzolan:Cement Ratio | SA1 (%bwob) | SA2 (%bwob) | Defoamer (gal/sk) | Retarder (%bwob) | Dispersant (%bwob) |
|---|---|---|---|---|---|---|---|---|---|
| C1 | 11.5 | Class C | - | Neat | 10 | - | 0.005 | 0.4 | - |
| C2 | 11.5 | Class C | Fly Ash | 50:50 | 10 | - | 0.005 | 0.4 | - |
| C3 | 11.5 | Class C | Pumice-Fly Ash | 50:50 | 10 | - | 0.005 | 0.4 | - |
| C4 | 14.2 | Class C | Pumice | 50:50 | 10 | - | 0.005 | 0.4 | - |
| C5 | 14.2 | Class C | - | Neat | 0.5 | 0.2 | 0.005 | - | - |
| C6 | 14.2 | Class C | Fly Ash | 50:50 | - | - | 0.005 | - | 0.5 |
| C7 | 14.2 | Class C | Pumice-Fly Ash | 50:50 | - | - | 0.005 | - | 0.5 |
| C8 | 14.2 | Class C | Pumice | 50:50 | - | - | 0.005 | - | 0.5 |
| C9 | 11.5 | Class C | Pumice | 40:60 | 10 | - | 0.005 | 0.4 | - |
| C10 | 11.5 | Class C | Pumice | 60:40 | 10 | - | 0.005 | 0.4 | - |
| C11 | 11.5 | Class C | Pumice | 70:30 | 10 | - | 0.005 | 0.4 | - |
| C12 | 14.2 | Class C | Pumice | 40:60 | - | - | 0.005 | - | 0.5 |
| C13 | 14.2 | Class C | Pumice | 60:40 | - | - | 0.005 | - | 0.5 |

*FIG. 3A*

Class H Cement Slurry Compositions

| Fluid | Density (ppg) | Cement | Pozzolan | Pozzolan:Cement Ratio | SA1 (%bwob) | SA2 (%bwob) | Defoamer (gal/sk) | Retarder (%bwob) | Dispersant (%bwob) |
|---|---|---|---|---|---|---|---|---|---|
| H1 | 11.5 | Class H | - | Neat | 10 | - | 0.005 | 0.4 | - |
| H2 | 11.5 | Class H | Fly Ash | 50:50 | 10 | - | 0.005 | 0.4 | - |
| H3 | 11.5 | Class H | Pumice-Fly Ash | 50:50 | 10 | - | 0.005 | 0.4 | - |
| H4 | 11.5 | Class H | Pumice | 50:50 | 10 | - | 0.005 | 0.4 | - |
| H5 | 14.2 | Class H | - | Neat | 1 | - | 0.005 | - | - |
| H6 | 14.2 | Class H | Fly Ash | 50:50 | 0.5 | - | 0.005 | - | - |
| H7 | 14.2 | Class H | Pumice-Fly Ash | 50:50 | 0.5 | - | 0.005 | - | - |
| H8 | 14.2 | Class H | Pumice | 50:50 | 0.5 | - | 0.005 | - | - |
| H9 | 11.5 | Class H | Pumice | 40:60 | 10 | - | 0.005 | 0.4 | - |
| H10 | 11.5 | Class H | Pumice | 60:40 | 10 | - | 0.005 | 0.4 | - |
| H12 | 14.2 | Class H | Pumice | 40:60 | 0.5 | - | 0.005 | - | - |
| H13 | 14.2 | Class H | Pumice | 60:40 | 0.5 | - | 0.005 | - | - |

NB ~ No H11 Slurry

*FIG. 3B*

Viscosity (FDR) vs Shear Rate (rpm)

| Cement | | Class C | | | | | | | |
|---|---|---|---|---|---|---|---|---|---|
| Density | | 11.5 ppg | | | | | | | |
| Fluid | | C1: Neat | | C2: Fly Ash (50:50) | | C3: Pumice-Fly Ash (50:50) | | C4: Pumice (50:50) | |
| RPM | | Up | Down | Up | Down | Up | Down | Up | Down |
| 300 | | 17 | | 18 | | 33 | | 32 | |
| 200 | | 16 | 16 | 18 | 18 | 31 | 31 | 28 | 29 |
| 100 | | 14 | 14 | 14 | 16 | 27 | 28 | 26 | 26 |
| 60 | | 12 | 14 | 13 | 16 | 26 | 27 | 24 | 25 |
| 30 | | 10 | 13 | 10 | 15 | 23 | 26 | 23 | 24 |
| 6 | | 8 | 12 | 7 | 14 | 20 | 23 | 20 | 22 |
| 3 | | 7 | 11 | 7 | 14 | 18 | 18 | 18 | 18 |

FIG. 17

Viscosity (FDR) vs Shear Rate (rpm)

Class H 14.2 ppg

| Cement | | | | | | | | | |
|---|---|---|---|---|---|---|---|---|---|
| Density | | | | | | | | | |
| Fluid | H5: Neat | | H6: Fly Ash (50:50) | | H7: Pumice-Fly Ash (50:50) | | H8: Pumice (50:50) | |
| RPM | Up | Down | Up | Down | Up | Down | Up | Down |
| 300 | 35 | | 36 | | 43 | | 56 | |
| 200 | 29 | 32 | 34 | 32 | 37 | 39 | 51 | 51 |
| 100 | 25 | 27 | 24 | 27 | 31 | 33 | 45 | 44 |
| 60 | 24 | 25 | 21 | 24 | 28 | 30 | 43 | 41 |
| 30 | 23 | 23 | 19 | 22 | 26 | 27 | 41 | 48 |
| 6 | 16 | 19 | 15 | 16 | 23 | 22 | 34 | 22 |
| 3 | 12 | 13 | 11 | 11 | 16 | 12 | 22 | 14 |

*FIG. 18*

CEMENT SLURRIES FOR WELL BORES

FIELD OF THE INVENTION

The present invention relates to cement slurries used in oil and gas wells and, and more particularly, to cement slurries containing pumice which may be used in wells to isolate tubulars from adjacent formations.

BACKGROUND OF THE INVENTION

Hydrocarbons, such as oil and gas, may be recovered from various types of subsurface geological formations. The formations typically consist of a porous layer, such as limestone and sands, overlaid by a nonporous layer. Hydrocarbons cannot rise through the nonporous layer. Thus, the porous layer forms a reservoir, that is, a volume in which hydrocarbons accumulate. A well is drilled through the earth until the hydrocarbon bearing formation is reached. Hydrocarbons then are able to flow from the porous formation into the well.

In what is perhaps the most basic form of rotary drilling methods, a drill bit is attached to a series of pipe sections referred to as a drill string. The drill string is suspended from a derrick and rotated by a motor in the derrick. A drilling fluid or "mud" is pumped down the drill string, through the bit, and into the well bore. This fluid serves to lubricate the bit. The drilling mud also carries cuttings from the drilling process back to the surface as it travels up the well bore. As drilling progresses downward, the drill string is extended by adding more pipe sections or "joints."

A modern oil well typically includes a number of tubes extending wholly or partially within other tubes. That is, a well is first drilled to a certain depth. Larger diameter pipes, or casings, are placed in the well and cemented in place to prevent the sides of the borehole from caving in. After the initial section has been drilled, cased, and cemented, drilling will proceed with a somewhat smaller well bore. The smaller bore is lined with somewhat smaller pipes or "liners." The liner is suspended from the original or "host" casing by an anchor or "hanger." A well may include a series of smaller liners, and may extend for many thousands of feet, commonly up to and over 25,000 feet.

As noted, casings are cemented in the well bore as the well is constructed. That is, the casing is smaller than the well bore in which it is installed. That gap between the casing it and the well bore is referred to as the annulus, and it is filled with cement after the casing has been installed. The cement helps to secure and reinforce the casing in the well bore and protect it against corrosion and erosion. It also supports the borehole walls from collapse. If fluids will be produced through the casing, cement helps ensure more precise control over stimulation processes, such as fracturing and acidizing. Most importantly, the cement is intended to form a complete seal around the casing. If the casing leaks, the cement will help ensure that fluids flowing through the casing do not contaminate the surrounding formation, and especially water-bearing formations. The cement also ensures that hydrocarbons and other fluids in the formation are not able to flow to the surface through the annulus.

The casing is cemented in the well bore by injecting cement, that is, a cementitious, settable composition down the casing and allowing it to flow up the annulus. Cement is basically a binder that may be formulated as an aqueous slurry which then sets, i.e., solidifies, hardens, and adheres to a material. The cement used in oil and gas wells is a hydraulic cement. Hydraulic cements are capable of setting in the presence of water. Hydraulic cement sets and adheres due to the chemical reactions between the dry ingredients (the "clinker") and water. Portland cement, which is by far the most common hydraulic cement, is predominantly (at least two-thirds by mass) of a mixture of tricalcium silicate ($3CaO.SiO_2$ or "$C_3S$") and dicalcium silicate ($2CaO.SiO_2$ or "$C_2S$"). The remainder of the dry components includes tricalcium aluminate ($3CaO.Al_2O_3$) or "$C_3A$"), tetracalcium aluminoferrite ($4CaO.Al_2O_3Fe_2O_3$ or "$C_4AF$"), and other minerals. The chemical reactions produce calcium silicate hydrate ($CaO.2SiO_2.4H_2O$ and other mineral hydrates in various crystal phases that are essentially insoluble in water.

Portland cement was developed in the 1840s, but hydraulic cements made from volcanic ash and other pozzolana, along with lime (calcium oxide—CaO), were used by the ancient Greeks and Romans. Pozzolanas are naturally occurring pozzolans—a broad class of siliceous and siliceous-aluminons minerals which are of volcanic origin. By themselves, pozzolans have little or no cementitious properties. When mixed with lime, and in the presence of water, however, they form insoluble mineral hydrates which constitute into a cement.

Pozzolans are still used today in various cements, most commonly as a supplement to Portland cement. Calcium hydroxide in hydrated Portland cements reacts with pozzolans and is reported to form calcium silicate hydrates which can enhance the strength and quality of the resulting cement. A variety of pozzolans are known to undergo such reactions, including silica fume, metakaolin, fly ash, diatomaceous earth, calcined and uncalcined diatomite, calcined fullers earth, pozzolanic clays, calcined and uncalcined volcanic ash, bagasse ash, pumice, pumicite, rice hull ash, natural and synthetic zeolites, slag, and vitreous calcium aluminosilicate. The degree to which that reaction occurs, the different silicate hydrates formed, and the properties imparted thereby, however, are not predictable, especially given the different types of Portland cement.

Portland cements are manufactured to meet certain chemical and physical standards which in turn are reflected in standard classes and grades. Different classes and grades are suited for different applications. Cements used in oil and gas wells are subjected to wide ranges of temperatures and pressures, often in frequent and extreme cycles, which are not encountered by cements used in the construction industry and other applications. Thus, the most common standards referenced by the oil and gas industry are those promulgated by the American Petroleum Institute (API). The most common of the API classes are classes A through H, with classes G and H being the most widely used.

API cements also are graded according to sulfate resistance. The grades are ordinary (O), moderate sulfate-resistant (MSR), and high sulfate-resistant (HSR). Sulfate-resistant grades are used to prevent deterioration of a cement sheath caused by sulfates present in formation waters and other well fluids.

When cements are mixed with water, they will form a slurry, that is, a mixture of solid particles suspended in water. As a casing is cemented, the cement slurry will transform from a non-Newtonian fluid pumped into the well to a solid material filling the annular space between the casing and the borehole. Ideally, the cement will form an intimate, continuous bond with both the casing and formation, and a uniform, continuous sheath extending through the annulus without channels or voids. That is not always easy to do, however, and many different properties must be controlled and balanced to provide a strong, highly robust, low-permeability sheath.

The rheology of the slurry, such as its density, viscosity, yield strength, and thickening time are critical to the pumping phase. Those properties will determine how easily the slurry can be pumped. The slurry must be sufficiently fluid so that it can be pumped into a well, and it must remain so long enough to allow the slurry to reach the target zone which will be cemented. The slurry must not be so thick that it cannot be pumped, but it must be denser and have a higher viscosity and yield point than fluids already in the well. The slurry must displace those fluids with a minimum of mixing. Fluids mixing with the slurry can diminish the strength and quality of the cement sheath. On the other hand, the slurry must not be so heavy that it causes the formation to fracture, or forces fluid to flow into the formation, both of which can permanently damage the formation and impair production from the well.

Once the slurry is in place and pumping is stopped, the slurry must transition quickly into a solid phase and build compressive strength to prevent the flow of formation liquids and gases. Gas flowing from the formation through the slurry as it cures, for example, can create channels and leak paths in the cement sheath. It also can diminish the strength of the bond between the cement sheath and the formation.

The stability of a slurry also is highly important in creating a uniform, continuous, and impermeable cement sheath. The particulates preferably are uniformly suspended in the slurry—and remain so as the slurry hardens—so that the set cement sheath is homogeneous throughout the annulus. That will ensure that the cement has uniform properties throughout the sheath. Excess water in the slurry, that is, water added beyond what is required for the hydration reaction, tends to separate out and rise to the top of the slurry as it hardens. In a horizontal well, that "free water" or "free fluid" can create pockets or channels running along the upper part of the annulus. The channels in turn can provide paths for the flow of fluids through the sheath. Thus, the slurry should generate a very minimum amount of free water or no free water at all.

Cement typically changes volume as it cures, and those volume changes can create problems. If a cement shrinks excessively it may pull away from the casing or formation as it hardens, thus creating flow paths for fluid through the sheath. Excess expansion, however, can cause the cement to fracture, and may create harmful pressure on the casing or formation.

Once hardened, the mechanical, permeability, interfacial, hydraulic, and thermal properties of the cement sheath are critical. The cement must be strong enough to support the casing in the annulus, to maintain a continuous, impermeable sheath isolating the zone, and to withstand the mechanical and thermal shock of well operations. Moreover, the cost of drilling and completing wells is determined in large part by how long it takes to do that. Thus, the slurry also should develop strength fast enough so that the time "waiting on cement" ("WOC") before other well operations can be started is kept to a minimum. The cement must develop sufficient strength to withstand the shock of further drilling, for example, before a new section of the well may be drilled. Even more strength may be required to perforate the well, and more still to fracture the well.

The cement sheath also must resist deterioration and fracturing over the life of the well. Fracturing can create leak paths through the sheath. In addition to its mechanical and thermal properties, its ability to resist water permeation is particularly important in maintaining the integrity of the sheath. To the extent that water can enter the cured cement, it can create micro channels in the cement that diminish the mechanical properties of the cement, thereby reducing its useful service life. Migration of water into the cement sheath is a particular concern in steam injection wells and in acidic wells. In the former, cement is simply exposed to much larger amounts of water, and especially pressurized water than is typical of most wells. In the latter, there are higher concentrations of corrosive acids that can permeate the cement.

It also will be appreciated that the economics and characteristics of a particular well may render it more suitable to a particular slurry formation. A particular formulation may provide extraordinary performance in one well and lead to complete failure in another. Cement jobs also have become more extensive. Casings have greatly increased in length over the past several years, as has the amount of cement pumped into the well. The bore hole may extend as far as 7,000 feet and may require over 600 US oil barrels (bbl) (42 gallons) of slurry to cement the casing. The increasing duration of cement jobs, especially if operations are interrupted for any reason, make it increasingly difficult to optimize cement slurries.

Fly ash has been a popular, pozzolanic additive in cements. It is known to improve various properties of cement slurries and the cured cement. Because it is produced as a byproduct of burning coal, it traditionally has been widely available from coal-fired electrical power plants at relatively low cost. The quality of fly ash, however, is not strictly maintained or controlled. It can differ significantly from batch to batch. Coal-fired plants also have come under intensifying environmental regulation. The amount of coal burned has been reduced significantly. Thus, it is increasingly difficult to obtain fly ash, its price has increased, and there is an increasing need to find substitutes for fly ash that are economical and have consistent quality.

The statements in this section are intended to provide background information related to the invention disclosed and claimed herein. Such information may or may not constitute prior art. It will be appreciated from the foregoing, however, that there remains a need for new and improved cement slurries. More particularly, there is a strong need for cement slurries incorporating pozzolans other than fly ash which have comparable or improved properties, comparable economics, and most importantly, more consistent quality. Such disadvantages and others inherent in the prior art are addressed by various aspects and embodiments of the subject invention.

SUMMARY OF THE INVENTION

The subject invention, in its various aspects and embodiments, relates generally to cement slurries used in oil and gas wells. The slurries may be used, for example, to cement a casing in a well. The invention encompasses various embodiments and aspects, some of which are specifically described and illustrated herein.

One aspect of the invention provides for a settable cementitious slurry for use in a subterranean well. The cement slurry comprises API Class C or Class H Portland cement and a pozzolan selected from the group consisting of pumice and mixtures of pumice and fly ash. Pumice is present in the mixtures in amounts at least about 40 weight percent (wt %) of the pozzolan. The weight ratio of the pozzolan to the cement is from about 35:65 to about 70:30.

Other embodiments provide such cement slurries where the pozzolan consists essentially of pozzolans selected from the group. In still other embodiments, pumice is at least about 50 wt % of the pozzolan or at least about 60 wt % of the pozzolan. In other embodiments the pozzolan is pumice alone.

Additional embodiments provide such cement slurries where the pozzolan has an average particle size less than about 20 μm, or from about 5 to about 20 μm, or from about 5 to about 10 μm.

Yet other embodiments provide such cement slurries where the pozzolan to cement ratio is from about 40:60 to about 60:40 or from about 50:50 to about 60:40.

Other embodiments provide such cement slurries where the slurry is substantially free of added lime or substantially free of other pozzolans.

Still other embodiments provide such cement slurries where the slurry has a density of from about 10 to about 16 ppg or from about 11.5 to about 14.5 ppg.

Additional embodiments provide such cement slurries where the slurry further comprises an additive selected from the group consisting of suspension agents, accelerators, retarders, fluid loss additives, dispersants, and free fluid additives.

In other aspects and embodiments, the invention provides method for cementing subterranean wells. The method comprises injecting a novel cement slurry into the well and allowing the slurry to set. Other aspects and embodiments provide subterranean wells comprising a novel cement slurry which has set.

Finally, still other aspect and embodiments of the invention will provide novel cement slurries and cementing methods having various combinations of such features as will be apparent to workers in the art.

Thus, the present invention in its various aspects and embodiments comprises a combination of features and characteristics that are directed to overcoming various shortcomings of the prior art. The various features and characteristics described above, as well as other features and characteristics, will be readily apparent to those skilled in the art upon reading the following detailed description of the preferred embodiments and by reference to the appended drawings.

Since the description and drawings that follow are directed to particular embodiments, however, they shall not be understood as limiting the scope of the invention. They are included to provide a better understanding of the invention and the way it may be practiced. The subject invention encompasses other embodiments consistent with the claims set forth herein.

BRIEF DESCRIPTION OF TIRE DRAWINGS

FIG. 1A is a schematic illustration of a liner assembly 10 being cleaned by a spacer fluid 20 in preparation for cementing liner 10 in a bore 8 of a well 1, wherein spacer fluid 20 is displacing a drilling mud 21 present in well 1.

FIG. 1B is a schematic illustration of liner assembly 10 being cemented in bore 8 of well 1, which shows a cement slurry 22 of the present invention being pumped into liner 10 behind spacer fluid 20.

FIG. 1C is a schematic illustration of liner 10 cemented in bore 8 of well 1.

FIGS. 3A and 3B are tables showing the composition and certain properties of the slurries tested in Examples 1-9.

FIGS. 17-18 are tables reporting viscosity data collected in Example 6 showing the viscosity of test slurries versus shear rate.

Figure 1A:
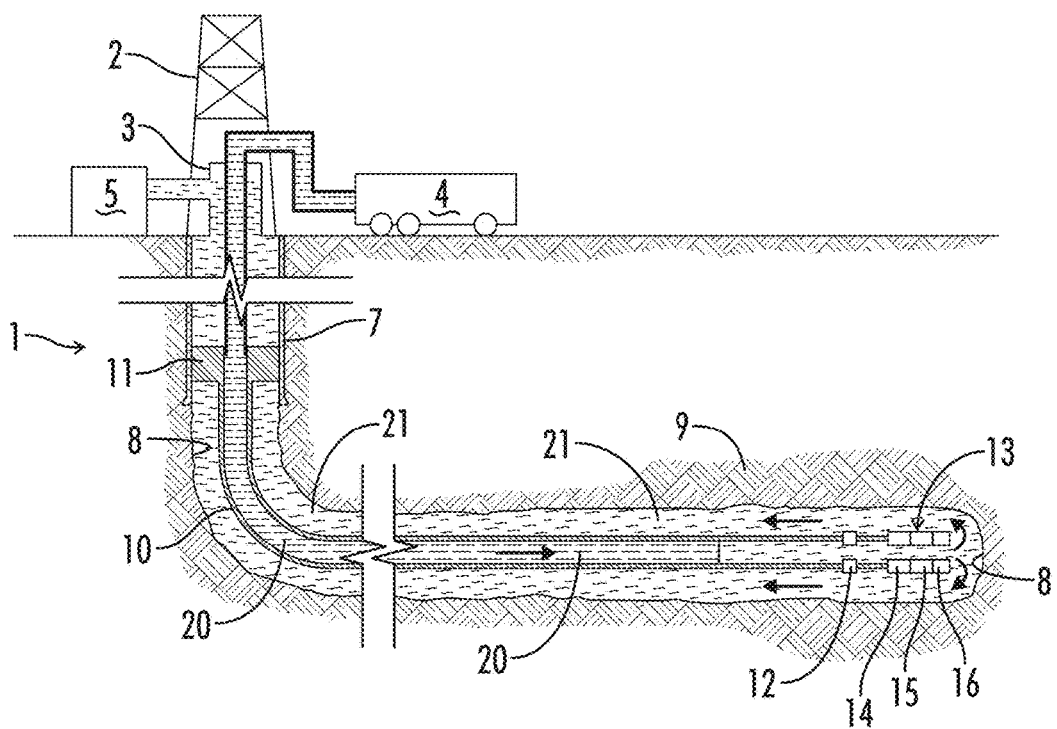

In the drawings and description that follows, like parts are identified by the same reference numerals. The drawing figures are not necessarily to scale. Certain features of the embodiments may be shown exaggerated in scale or in somewhat schematic form and some details of conventional design and construction may not be shown in the interest of clarity and conciseness.

DESCRIPTION OF ILLUSTRATIVE EMBODIMENTS

The invention, in various aspects and embodiments, is directed generally to cement slurries used in oil and gas wells, for example, to cement a casing or liner in a well. As used herein, and depending on the context, cement shall be understood as referring to both cured cement and to the dry powdered cement used to make cement slurries. Cement slurries are intended to reference aqueous suspensions of powdered cement and other cementitious particulates.

It is believed that the invention provides surprising improvements in various properties of both cement slurries and cured cement, including high early setting strength, cured strength, volumetric stability, and extremely low permeability. Specific embodiments will be described below. For the sake of conciseness, however, all features of an actual implementation may not be described or illustrated. In developing any actual implementation, as in any engineering or design project, numerous implementation-specific decisions must be made to achieve a developer's specific goals. Decisions usually will be made consistent within system-related and business-related constraints. Specific goals may vary from one implementation to another. Development efforts might be complex and time consuming and may involve many aspects of design, fabrication, and manufacture. Nevertheless, it should be appreciated that such development projects would be routine effort for those of ordinary skill having the benefit of this disclosure.

The novel cement slurries may be used for various well operations, but are particularly useful in cementing casings in a well. There are many different approaches to cementing a casing. Likewise, many different systems will be used to prepare and deliver cement slurries into a well. The novel cement slurries in general may be used in any such conventional methods and systems.

Overview of Cementing Operations

The use and application of the novel cement slurries will be described by reference to FIG. 1 which schematically illustrate a cementing operation or "job" where a liner assembly 10 is cemented in a well 1. As may be seen in FIG.

1A, well 1 is serviced by a derrick 2, a cementing head 3, and a cement trailer 4. As described further below, cement trailer 4 will be used to prepare a spacer fluid 20 and a novel cement slurry 22. Pumps on cement trailer 4 will be used to introduce spacer fluid 20 and cement slurry 22 into well 1. Other surface equipment (not shown) will be used in the operation, including retention tank 5 where liquids displaced from well 1 will be held for disposal or recycling.

The upper portion of well 1 is provided with a casing 7, while the lower portion is an open bore 8 extending generally horizontally through a hydrocarbon bearing formation 9. Liner assembly 10 has been suspended from casing 7 by a hanger assembly 11 and extends through open bore 8. Liner assembly 10 includes various tools, including toe valve 12 and a float assembly 13. Float assembly 13 typically includes various tools that assist in running liner 10 into well 1 and cementing it in bore 8, such as a landing collar 14, a float collar 15, and a float shoe 16.

FIG. 1A depicts well 1 as liner 10 and bore 8 are being cleaned by spacer fluid 20. A quantity or "pad" of spacer fluid 20 is being pumped from trailer 4 into well 1. As spacer 20 is pumped, it will displace drilling mud 21 or other fluids present in liner 10 and bore 8. Drilling mud 21 will flow up the annulus between liner 10 and bore 8 to the surface where it is diverted into retention tank 5.

Figure 1B:
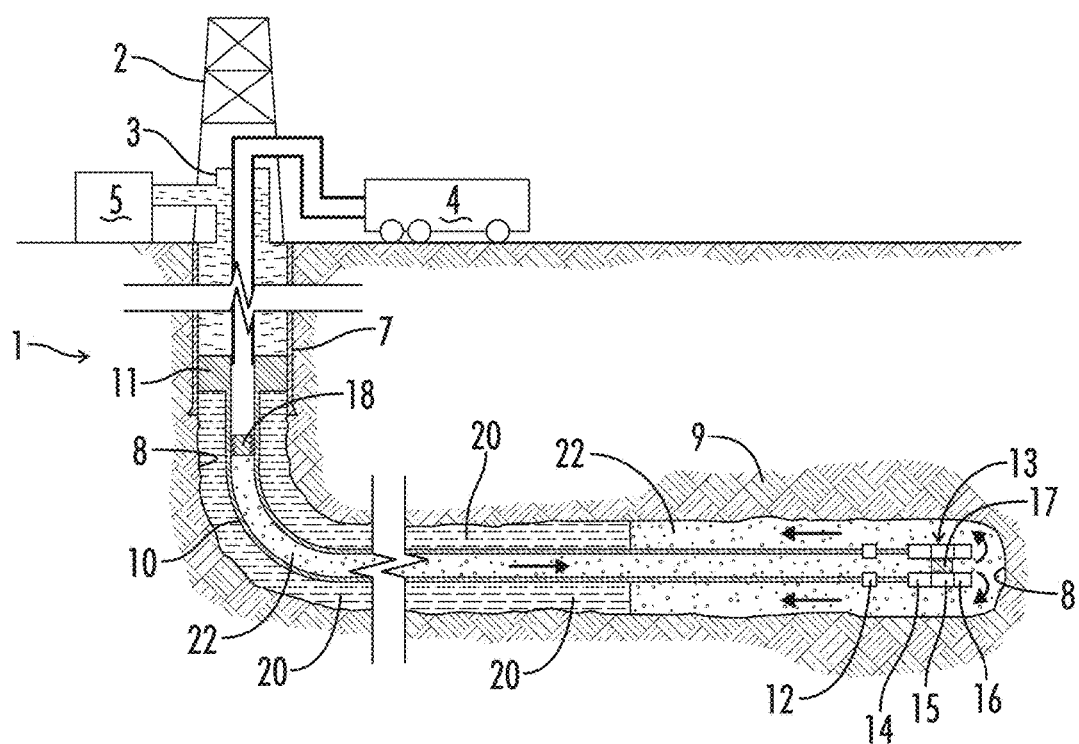
Figure 1C:
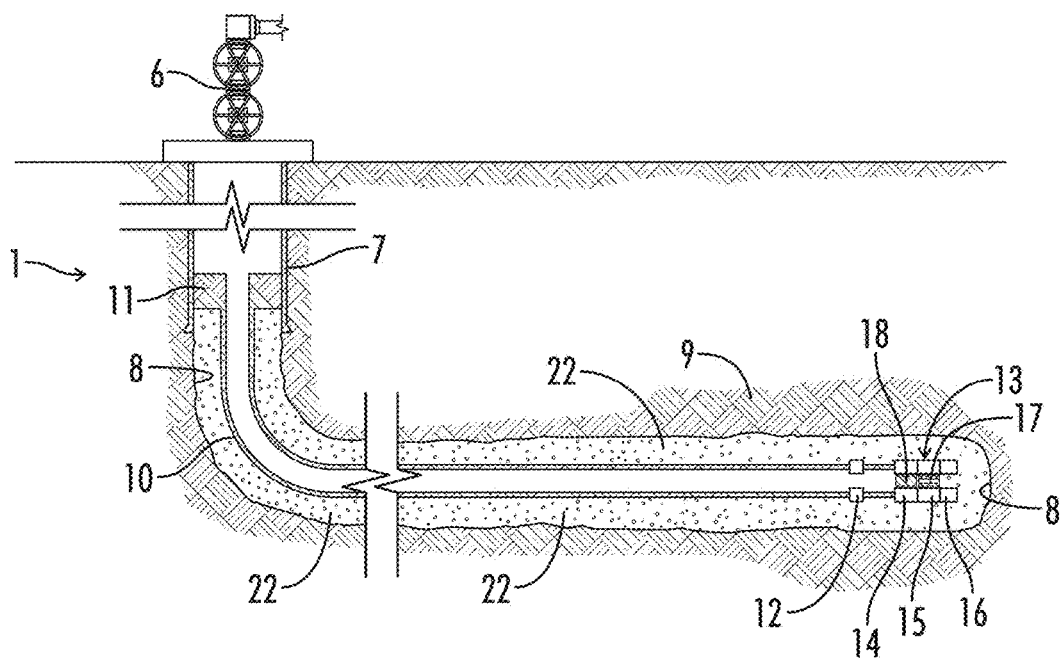

FIG. 1B depicts well 1 as liner 10 is being cemented in bore 8. Cement 22 is being pumped through liner 10 into bore 8. Typically, a "bottom" plug 17 will be deployed in advance of cement 22. It separates cement 22 from spacer fluid 20 as it moves through liner 10. As shown in FIG. 1B, bottom plug 17 will land on float collar 15 in float assembly 13. Bottom plug 17 has been opened by increasing pressure behind cement 22, allowing cement 22 to flow out the lower end of liner 10 and up into the annulus. A top or "wiper" plug 18 is being pumped behind cement 22. It follows cement 22 as it flows through liner 10. Wiper plug 18 will help clean and remove cement 22 from the inside of liner 10. It will pass through toe valve 12 and eventually seat on landing collar 14, as shown in FIG. 1C.

Pumping will continue until cement 22 completely fills the annulus between liner 10 and bore 8. It then will be allowed to set, as seen in FIG. 1C. Cement 22 now helps to support liner 10 in well bore 8 and forms a complete seal around liner 10. Derrick 2 and cement head 3 have been replaced by a well head 6. Well head 6 may be used in conducting other well operations, such as fracturing or other stimulation operations.

It will be noted that methods and systems for cementing operations are complex and varied. FIG. 1 are greatly simplified schematic representations of a common cementing operation. Production liner 10 is shown only in part as such liners may extend for a substantial distance. It also will be appreciated that the course of the well bore may not necessarily be as depicted schematically in FIG. 1. Depending on the location and orientation of the hydrocarbon bearing formation to be accessed, the course of the well bore may be vertical, or more or less deviated in any number of ways.

FIG. 1 also depict cementing of a liner and, more specifically, a production liner which may be used to stimulate and produce hydrocarbons from the well. A "liner," however, can have a fairly specific meaning within the industry, as do "casing" and "tubing." In its narrow sense, a "casing" is generally considered to be a relatively large tubular conduit, usually greater than 4.5" in diameter, that extends into a well from the surface. A "liner" is generally considered to be a relatively large tubular conduit that does not extend from the surface of the well, and instead is supported within an existing casing or another liner. It is, in essence, a "casing" that does not extend from the surface. "Tubing" refers to a smaller tubular conduit, usually less than 4.5" in diameter. The novel fluids and operations, however, are not limited in their application to liners as that term may be understood in its narrow sense. They may be used to advantage in liners, casings, tubing, and other tubular conduits or "tubulars" as are commonly employed in oil and gas wells, although most commonly only casings are referenced herein in exemplifying the invention.

The fluid delivery system also has been greatly simplified, as have cementing procedures. For example, a fluid "train" consisting of pads of additional fluids other than spacer 20 and cement 22 often are used in cement jobs. A pad of fluid may be pumped into the well under turbulent flow to "flush" the well. The liner also may incorporate other tools to assist in the process, such as return flow diverters which allow fluid returning up the annulus to flow past the liner hanger. The spacer fluid may or may not be circulated completely out of the well. It is believed that the novel fluids may be used in the context of many known systems and methods for cementing a well. An appropriate system and method may be selected with routine effort by workers in the art. Nevertheless, it is believed the methods and systems described herein will provide an understanding of the broader context in which the novel fluids may be used.

The novel cement slurries are settable compositions which are suitable for use in oil and gas wells. Broader embodiments include slurries comprising Class C and Class H cement and a pozzolan. Other embodiments consist of or consist essentially of the cement and pozzolan. The pozzolan is selected from the group consisting of pumice and mixtures of pumice and fly ash. The pumice is at least about 40 weight percent (wt %) of the pozzolan. The weight ratio of the pozzolan to cement in the slurry is from about 35:65 to 70:30. As discussed further below, it is believed that the specified pozzolan provides surprising improvements in various properties of both the slurry and the cured cement, including early setting strength, cured strength, volumetric stability, and extremely low permeability of the set cement. It may be expected, therefore, that cement sheaths made from the novel slurries will provide increased support for a casing, form better seals between a casing and the formation, all over an extended service life.

Base Fluid

The base fluid of the novel cement slurries is water, and it will be understood that water will include fresh water and salt water. "Salt water" as used herein may include unsaturated salt water or saturated salt water "brine systems", such as a NaCl or KCl brine, as well as heavy brines including $CaCl_2$, $CaBr_2$, and $KCO_2H$. Water is necessary for the hydration reaction by which the cementitious particulates in the slurry are transformed into a solid, continuous matrix. Seawater, like most inorganic salt brines, will slightly accelerate the setting time of the slurry. High salt content, especially high calcium chloride concentrations, however, may decrease the cement set time.

The base fluid will constitute a substantial portion of the fluid, but the optimum amount typically reflects a compromise. In general, water must be present in minimum weight ratio to particulates of about 0.35:1, or about 26 wt % or about 2.8 gallons/sack (1 cubic foot) of cement (gal/sk), to fully hydrate the cementitious particulates. That will provide the resulting cement with the greatest strength. It is difficult, however, to thoroughly mix particulates into a slurry using the minimum amount of water required for hydration. The resulting slurry also may be too thick to pump. Thus, cement slurries typically will incorporate an excess amount of water.

On the other hand, water that is not consumed by the hydration process tends to migrate out of slurry as it cures. That bleeding of water can leave behind microscopic pores in the cured cement that reduce its strength. Pores also can provide channels for the introduction of deleterious chemicals, such as dissolved sulfates, which can further weaken the cement over time. Excess water also can lead to shrinkage of the slurry as it sets. The slurry may tend to draw away from a casing or the formation, or it may form internal cracks as it sets, creating flow paths for hydrocarbons around and through the cement sheath.

The cement slurry also must be heavy enough to displace well fluids, such as cement spacers, that already are present in the well. Thus, the amount of water generally will be coordinated with the other components to provide a specific density. Densities from about 10 to about 16 pounds per gallon (ppg) generally may be formulated by adjusting the amount of water added to the slurry with, as discussed below, conventional suspension agents. At such typical densities, water will be added in amounts from about 35 gal/sk to about 5 gal/sk. If the slurry is required to have lighter or heavier densities, special additives generally will be required. In any event, workers in the art, with the benefit of this disclosure, will recognize the appropriate amount to use for a chosen application.

Cement

The novel cement slurries comprise cements meeting the American Petroleum Institute (API) standards for Class C or Class H cement. Class C cements may be ordinary grade (O), moderate-sulfate resistant grade (MSR), or high-sulfate resistant grade (HSR). Those cements are commercially available as dried powders from various sources. Since cement is manufactured primarily from mined mineral deposits or waste products from other industries, its chemical composition and physical properties may vary within a class or grade. Accordingly, the chemical and physical specifications promulgated by the API typically are set forth as specified minimums or maximums. Suppliers of cement include GCC of America, Inc., Glendale, Colo., Dyckerhoff GmbH, Wiesbaden, Germany, Texas Lehigh, Buda, Tex., and Lafarge (LafargeHolcim), Chicago, Ill.

The amount of cement in the novel slurries will be coordinated with the amount of pozzolan, with the cement comprising from about 65 to about 30 wt % of the base material, i.e., the dry, powdered cementitious components.

Pozzolans

The novel cement slurries comprise pozzolans selected from the group consisting of pumice and mixtures of pumice and fly ash. Preferably, the slurries consist essentially of cement and the specified pozzolans or are substantially free from pozzolans other than the specified pozzolans. It is believed that the specified pozzolans provide surprising improvements in various properties of both the slurry and the cured cement, including early setting strength, tensile and compressive cured strength, volumetric stability, and extremely low permeability.

Pumice is a rock of volcanic origin. It is characterized not so much by its chemical composition, but by its micro structure. It is a rock consisting of highly micro vesicular glass, with or without crystals, which results from rapid and simultaneous depressurization and cooling. As magma rises through a vent, it is depressurized. Gas dissolved in the magma is released and creates a froth which freezes upon ejection into the atmosphere. The vesicles, that is, the tiny chambers of trapped gas within pumice make it very light, and pumice will float on water.

Most pumice is silicic, ranging from about 65% to 75% silicon dioxide ($SiO_2$) with lesser amounts of aluminum oxide ($Al_2O_3$) and trace amounts of other oxides, and was formed from dacitic to rhyolitic magma. Pumice also may be felsic, or it may have intermediate compositions such as andesite, pantellerite, phonolite, and trachyte. Basaltic pumice also is known.

In its powdered form, pumice is referred to a pumicite, and it is in its powdered form that pumice is incorporated into the novel cement slurries. Preferably, the pumice will have average particle sizes of less than about 20 microns (μm), preferably from about 5 to about 20 μm, and more preferably from about 5 to 10 μm. It will be appreciated that particle sizes are determined by various methods in the industry, and are not always readily disclosed by suppliers. Wire mesh screens may be used to size particles by screening out particles above a specified size. More commonly, however, particle size analyzers which measure particle size by diffracting laser beams off a sample will be used.

Pumicite is available commercially from various sources. The pumice typically is mined from deposits, and then ground, sifted, or otherwise processed into product of specified particle sizes and grades. Since it is a natural product, its chemical composition and physical properties may vary, even when sourced from a single deposit. It also will be understood, therefore, that in the context of the present disclosure, pumice will be understood as not being limited to particular minerals or mixtures of minerals. Similarly, it encompasses not only "pure" pumice, but also to pumice mixed with such other particulates and associated minerals as may be present in commercially available pumice produced from natural sources. Suppliers of pumice include Hess Pumice Products, Malad City, Id. (Processed, Mine, and NCS grades), General Pumice Products, Carlsbad, Calif., and CR Minerals, Espanola, N. Mex. (Navajo, Safsil, Tephra, PFM, and Mine Grade).

Fly ash is a fine dust formed as a byproduct of coal combustion. It typically is sourced from coal-fired electrical power plants which collect it from flue gases as they are discharged into the atmosphere. The components of fly ash vary widely depending on the type of coal being burned. Typically, however, fly ash includes substantial amounts of silicon dioxide ($SiO_2$), both amorphous and crystalline, calcium oxide (CaO), aluminum oxide, and iron oxide ($FeO_2$).

Depending on the type of coal being burned, it is classified into classes. In particular, Standard C618 promulgated by ASTM International defines two types of fly ash having a carbon content and particle size which renders them suitable for use in cements. Class C fly ash is generally produced when younger lignite and subbituminous coal is burned. Class F fly ash is generally produced when harder, older anthracite and bituminous coal is burned. The primary difference between the two classes is the amount of calcium, silica, alumina, and iron in the fly ash. So-called "non-spec" fly ash does not meet ASTM C618 standards. Since it is a natural product, the specifications for "spec" fly ash can vary considerably depending on the source. Non-spec fly ash is particularly variable.

The pozzolan includes at least about 40 wt % of pumice. That is, pumice alone may be used in the novel cement slurries. When a mixture of pumice and fly ash is used, however, pumice will comprise at least about 40 wt % of that mixture. Preferably, it will comprise at least about 50 wt % of the mixture, and more preferably, at least about 60 wt % of the mixture.

In turn, the amount of pozzolan in the novel slurries will be coordinated with the amount of cement. The pozzolan will comprise from about 35 to about 70 wt % of the base material. In other words, the weight ratio of pozzolan to cement is from about 35:65 to about 70:30. Preferably, the weight ratio will be from about 40:60 to about 60:40, and more preferably from about 50:50 to 60:40.

Scoria is a vesicular volcanic rock similar in structure to pumice. The vesicles, however, are somewhat larger than those in pumice, and the vesicle walls are somewhat thicker. Though still relatively light, scoria is denser than, and will sink in water. It may or may not contain crystals. Typically, it is basaltic or andesitic in composition. Given that they are similar in micro-structure and composition, and that the distinction between pumice and scoria in some respects is arbitrary, it is believed that scoria may impart similar effects. Thus, for purposes of the subject invention "pumice" shall be understood to included scoria.

Suspension Agent

The novel cement slurries preferably comprise a suspension agent. The suspension agent primarily serves to enhance the viscosity and yield point of the slurry such that the slurry is capable of suspending the particles of cement, pozzolan, and other particulates and displacing fluids in the well, preferably with minimal mixing. The suspension agent also serves to tie up excess water in the slurry and avoiding the generation of excess amounts of free fluid as the slurry cures. Accordingly, it may be selected from many conventional agents used to thicken aqueous fluids.

Clays and gelatins are a common type of suspension agent for cement slurries. Suitable clays include kaolinites, montmorillonite, bentonite, hydrous micas, attapulgite, sepiolite, and the like, as well as synthetic clays, such as laponite. Bentonite is a very common suspension agent.

Polymers which hydrolyze when mixed with water are another common type of suspension agent. As the polymer is hydrolyzed, the base fluid becomes thicker and better able to maintain solid particulates in suspension. Such polymers include natural gums, such as welan, gellan, xanthan diutan, and galactomannan gums. Welan gum is an exopolysaccharide produced by fermentation of sugar by the bacteria *Sphingomonas* sp. ATCC 31555. The molecule consists of repeating tetrasaccharide units with single branches of L-mannose or L-rhamnose. Gellan gum is a water-soluble anionic polysaccharide produced by the bacterium *Sphingomonas elodea* (formerly *Pseudomonas elodea*). The repeating unit of the polymer is a tetrasaccharide, which consists of two residues of D-glucose, a residue of L-rhamnose, and a residue of D-glucuronic acid connect by glycosidic bonds. Xanthan gum is a polysaccharide produced by the bacterium *Xanthomonas campestris*. It has a $C_{35}H_{49}O_{29}$ monomer. Diutan gums are heteropolysaccharides produced by the bacterium *Sphingomonas* sp. ATCC 53159. It is a tetrasaccharide, having four sugars in the backbone (glucose-glucuronic acid-glucose-rhamnose) and a side chain of two rhamnose residues attached to one of the glucose residues. Galactomannan gums are neutral, water-soluble polysaccharides consisting of a mannose backbone with galactose side groups. More specifically, they typically consist of a β-(1→4) linked D-mannopyranose backbone with α-(1→6) linked galactopyranose side chains. They may be characterized by their mannose-to-galactose ratio, and include, in order of increasing ratio: fenugreek gum (~1:1), guar gum (~2:1), Lara gum (~3:1), and locust bean gum or carob gum (~4:1). Chitosans and starches also may be suitable.

Synthetic polymers also may be used, such as high molecular weight hydroxyethyl cellulose (HEC), polyacrylate, polymethacrylate, polyethyleneimine, polyacrylamide, polyvinyl alcohol, and polyvinylpyrrolidone. Copolymers and other derivatives of such natural and synthetic polymers also hydrolyze in water. Derivatives of galactomannan gum, for example, include various copolymers thereof, such as hydroxypropyl guar (HPG) and carboxymethyl hydroxypropyl guar (CMHPG). In accordance with this aspect of the disclosure, the term "copolymer," as used herein, is not limited to polymers comprising two types of monomeric units, but is meant to include any combination of monomeric units, e.g., terpolymers, tetrapolymers, and the like.

The suspension agents may be derived from natural products or synthesized by methods known to workers in the art. They also are commercially available, typically in the form of a dried powder, from many commercial producers and distributors of chemical products.

The suspension agent generally will be added in amounts sufficient to provide the viscosities required for a particular application as determined by routine effort. By weight, it is a relatively small component of the slurries. The amount of suspension agent, however, may vary significantly. For the most part, the amount of suspension agent will be fairly closely correlated to the amount of particulates in the slurry and, therefore, the density of the slurry. As more particulates are added, more polymer generally will be required to keep the particulate matter in suspension.

Bearing the foregoing in mind, however, in general the suspension agent may be loaded into the slurry in amounts from about 0.02 to about 0.2 ppg (about 0.2 wt % to about 2 wt %). Preferably, it may be loaded in amounts from about 0.03 to about 0.15 ppg (about 0.25 to about 1 wt %). The precise loading of suspension agent for a particular application will be determined by the degree of viscosity to be imparted to the slurry and may be determined by routine effort.

Additives

The base cement slurries of the invention are believed to have significantly improved properties. They may be used in many different wells and in many different operations presenting a variety of conditions. Thus, certain embodiments of the novel cement slurries may comprise additives designed to enhance the performance of the slurries in other ways as may be required or desirable for specific applications. Many such additives are known to workers in the art, are commercially available from a number of sources, and in general may be used in the novel slurries provided they are compatible with the other components.

For example, and as noted, adding water beyond that which is required to hydrate the cement is often required to produce a pumpable slurry, but it can increase the amount of free water produced as the slurry cures. The suspension agent and other common additives like fluid loss control polymers will hydrate and tie up excess water in the slurry, thus reducing the amount of free water bled by the slurry.

The amount of suspension agent may be increased, but other free fluid agents, such as sodium silicate, may be added.

The rate at which hydration occurs also may be adjusted by adding accelerators or retarders. Slurries used in shallower, lower temperature well may require accelerators to increase the strength development of the cement and to shorten the WOC time before well operations may be resumed. At higher temperatures, it may be necessary to add retarders to ensure that the slurry remains in a pumpable state for complete placement in the target zone.

Calcium chloride is the most common accelerator, with anhydrous calcium chloride being the most common grade used. It is typically added in amounts from about 2 to about 4% by weight of cement ("bwoc"), i.e., by weight of the dry, powdered cementitious components. Sodium chloride is a slight accelerator, although at high and saturated concentrations it can cause retardation.

The most common retarders are natural lignosulfonates and synthetic copolymers of 2-acrylamido-2-methyl-propanesulfonic acid and acrylic acid. Lignosulfates are metallic sulfonate salts derived from lignin recovered from processing wood waste. Calcium lignosulfate is most commonly used and most commonly in concentrations of from about 0.1 to beyond 1.0 wt % bwoc.

Extenders may be used to provide low-density cement slurries with sufficient compressive strength. Simply adding more water to the slurry will reduce its density but will also compromise the strength of the set cement. Therefore, addition of more water is partly substituted with lightweight density additives to maintain the strength of the cement. If further reduction in density is desired like below the density of water, or if the deleterious effects of adding excess water cannot be managed, the density of a cement slurry also can be reduced by foaming the slurry with compressed gas, such as nitrogen. Foamed cement slurries may have densities in the range of about 4 to about 7 ppg. Hollow ceramic spheres also may be added, or low-density aggregates such as gilsonite and expanded perlite may be added. It also will be appreciated that both pumice and fly ash have lower specific gravities than cement. Thus, the pozzolan in the novel slurries also serves as a unique extender up to a certain density of cement.

In some instances, it may be necessary to increase the density of a cement slurry, usually to offset high fluid pressure in the formation and prevent the flow of fluids into the annulus as the cement sets. Heavy weighting agents, such as hematite, ilmenite, hausmannite, barite, and sand, may be added to the slurry for such purposes.

Fluid loss additives also are commonly added to reduce the rate and amount of water forced into a porous formation. Water bleeding into the formation can dehydrate the slurry and make it harder to pump the remaining slurry. It also can damage water-sensitive formations and create opportunities for gas migration through the slurry. Fluid loss additives include polymers, such as cellulose, carboxymethyl hydroxyethyl cellulose, polyvinyl alcohol, polyethyleneimine, copolymers including 2-acrylamido-2-methyl-propanesulfonic acid, and liquid latexes such as styrene-butadiene latex. Hydroxyethyl cellulose (HEC) and other cellulose derivatives are perhaps the most commonly used fluid loss additive, especially in lower temperature wells and low-density slurries. They are typically added in amounts from about 0.3 to 3 wt % bwoc.

Dispersants also are commonly added to improve the flow properties of slurries, especially those of higher density slurries. They can help reduce a slurry's tendency to gel and make thicker fluids with less water easier to pump. They also can aid in reducing fluid loss. The most common dispersant is polysulfonated napthalene (PNS).

Other, less common additives also may be used, such as lost circulation additives. Lost circulation additives, such as gilsonite, ground coal, and ground walnut hulls, are used to plug zones that have a tendency to draw in fluids because they are weak or unconsolidated. Expansion additives may be used to encourage the cement to expand and to avoid the creation of a "micro annulus" as cement shrinks away from a casing or formation. Additives based on calcium sulphoaluminate, magnesium oxide, and calcium oxide are the most common. Antifoam agents, such polyglycols, silicones, and other surfactants, may be added to the water to control foaming when dry ingredients are blended with water.

As noted, pozzolans by themselves have little or no cementitious properties. If finely divided, however, and mixed with water, they can react with lime (calcium hydroxide—$Ca(OH)_2$), set, and form a cementitious solid with sufficient compressive strength. When mixed with the specified cements as described above, however, calcium hydroxide will be released as the cement hydrates. The calcium hydroxide can then further react with the pumice to form secondary cementitious material, further increasing the strength of the set cement. Thus, preferred embodiments of the novel cement slurries will not comprise any additional lime, including hydrated lime, or other activators.

It will be appreciated that there are a variety of pozzolans in addition to pumice and fly ash. Various preferred slurries have been described where mixtures of pumice and fly ash are used in the slurries, or where pumice alone is used. Other pozzolans may be added to the slurry if desired. Given the improved properties imparted by blending pumice into the slurry, however, preferred slurries are substantially free of other pozzolans.

Making and Using the Novel Slurries

Various components and their concentrations in the novel cement slurries are described above. The choice of particular components among those generally suitable for use in the novel slurries and the concentration thereof, however, will depend on the precise chemical and physical properties of the slurry that are needed for a particular operation. Cost considerations also may come into play. Workers in the art, having the benefit of this disclosure, may optimize the formulation of the novel slurries for a particular application by reference to principles well known in the art and by routine experimentation.

Moreover, it will be appreciated that various functions and mechanisms have been ascribed to each component of the novel slurries and to their effect on the overall properties of the slurry. While such explanations are believed to be accurate, and are believed to provide useful guidance in making and using the novel slurries, it will be understood that the invention is not limited thereby. The economics and characteristics of a particular well also may render it more suitable to a particular slurry or cement. A cement slurry may provide extraordinary results in one well and be completely unsuitable for use in another. Thus, general statements should be taken as such, and not as definitive, immutable principles. As demonstrated by the examples which follow, regardless of their respective individual properties, the mechanism by which they function, or their effectiveness in other slurries, the novel slurries have improved properties which may be used to advantage in cementing wells.

In general, the novel cement slurries may be made and pumped into a well by methods and equipment well known and used by workers in the art. For example, an aqueous base fluid typically will be stored on site in tanks. A dry mixing unit may be used to mix the cement, pozzolan, suspension agent, and any other dry components on site or, for example, the cement and pozzolan may be pre-mixed off site. Blenders may be provided to premix liquid components and, if preferred, the minor dry components, such as accelerants, retardants, and antifoaming agents, to the base fluid.

The slurry may be made in batches or on-the-fly. In a batch method, the mixture of dry components is dispensed into a mixing tank on a hydration unit. The tank is provided with mixers, such as paddles, hydraulic jet mixers, and the like, which blend the dry components into the base fluid. Batch mixing allows precise control over the density of the slurry, but it may not produce enough slurry for large cement jobs. Mixing on-the-fly involves adding dry components to a steady stream of base fluid. The components are mixed in an area of high turbulence created with high velocity jet mixers. While it may enable larger cement jobs to proceed in a single stage, on-the-fly mixing is much more difficult, and requires more careful control to maintain proper slurry density.

In either event, hydraulic pumps will be used to energize the fluid and to discharge it into a cementing head, such as cementing head 3 shown in FIGS. 1A and 1B. Cementing head 3 also will divert returning fluids into, for example, retention pit 5 for treatment, reconstitution, or disposal. Pumping rates and quantities of slurry pumped also can vary considerably depending on the slurry and the well which will be cemented. In general, however, typical cement jobs will pump from about 50 to about 650 barrels of cement slurry into a well, typically at rates from about 1 to about 6 bbl/min).

The novel slurries have been described primarily in the context of so-called "primary" cement jobs where a casing or a liner is cemented in an open well bore. It will be appreciated, however, that they may be used in other cementing operations. For example, they may be useful in remedial cement jobs, such as a "squeeze" cement jobs initiated to seal voids in a tubular string, cement sheath, gravel pack, or formation. The cement slurries also may be used in other types of operations. They may be used, for example, to form plugs in a damaged deviation.

It also will be appreciated that when specifying ranges, such as the loading of cement, pozzolan, or other components in the novel slurries, such ranges are intended to describe each value in the range and ranges between any two values. For example, if pozzolan is specified as being loaded in weight ratios of from about 40:60 to about 60:40, the range describes loadings in weight ratios of about 40:60, about 41:59, about 42:58, and so forth, as well as ranges from about 41:59 to about 59:41, about 42:58 to about 58:42, and so forth, and all inclusive ranges. Similarly, if the range is specified as less than or more than a particular loading, it describes inclusive specific and ranges of loadings. Moreover, even when unmodified by "about" or similar terms, numbers referring to a particular quantity, level, or the like shall be understood as including the specified quantity and somewhat smaller and larger quantities as provide substantially the same effect.

Terms such as lighter and heavier, and less dense and denser at times are used to describe the novel slurries. When so used in the absence of a specific comparison, "lighter" and "less dense" slurries shall be understood as referring generally to slurries having a density of less than about 10 ppg. "Heavier" and "denser" slurries shall refer to slurries having a density greater than about 16 ppg. "Typical" slurries will be understood as referring generally to slurries having densities of from about 10 to about 16 ppg.

EXAMPLES

The invention and its advantages may be further understood by reference to the following examples. It will be appreciated, however, that the invention is not limited thereto.

Examples—Materials, Equipment, and General Procedures

Cement slurries for the examples that follow were prepared using the following components:

Base fluid. Tap water from Tomball, Tex.

Class C Cement. Class C Portland cement manufactured at the Odessa, Tex. plant of GCC of America, Inc., Glendale, Colo. The cement has a reported Blaine fineness of 423 $m^2$/kg. The mean particle size was determined to be approximately 13.8 μm.

Class H Cement. Class H Portland cement manufactured at the Joppa, Ill. plant of Lafarge (LafargeHolcim), Chicago, Ill. The cement has a reported Blaine fineness of 312 $m^2$/kg. The mean particle size was determined to be approximately 28.35 μm.

Figure 2:
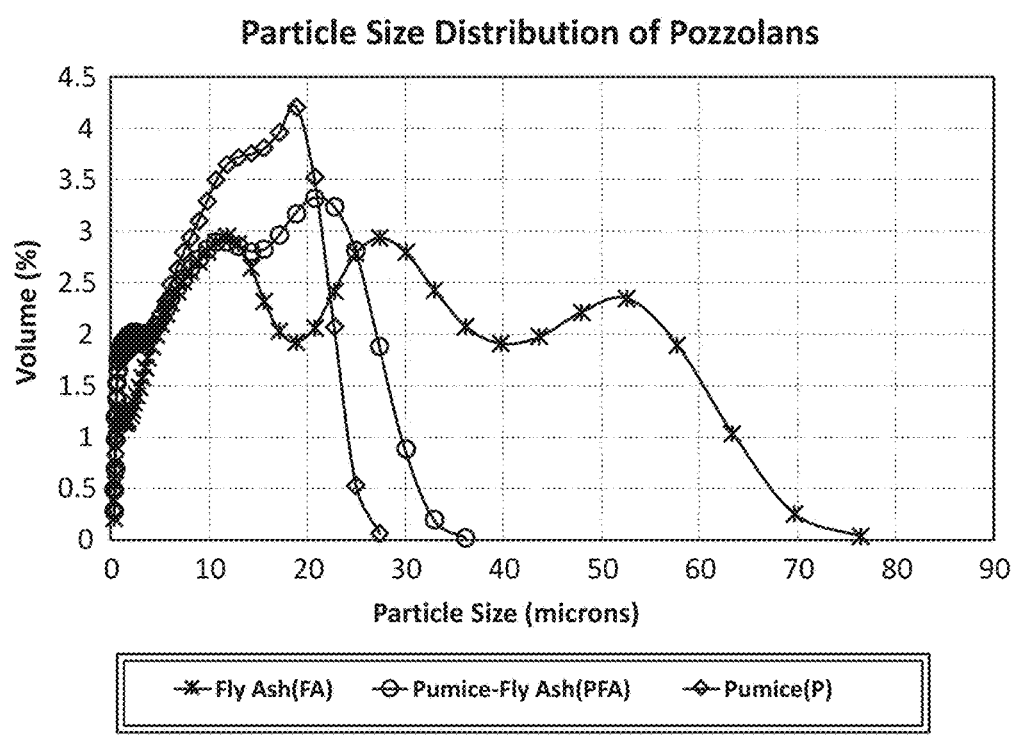
FIG. 2 is a graph showing the particle size distribution of pozzolans blended into the test slurries.
Figure 4:
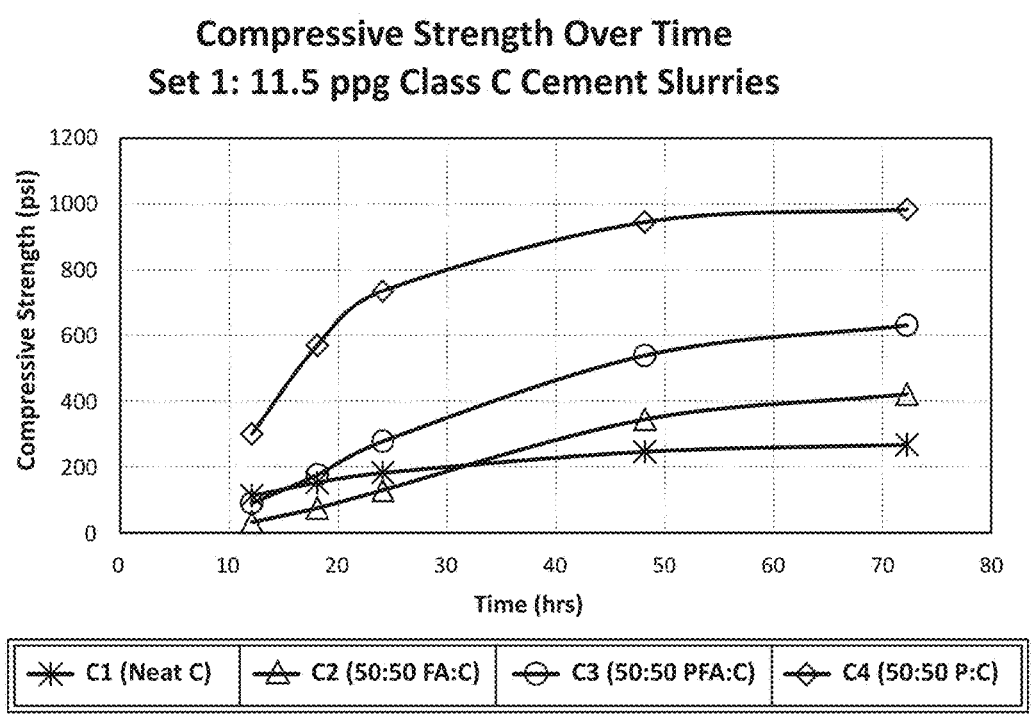
FIGS. 4-7 are graphical presentations of the data collected in Example 1 showing the UCA compressive strength of test slurries over time as they cured.
Figure 5:
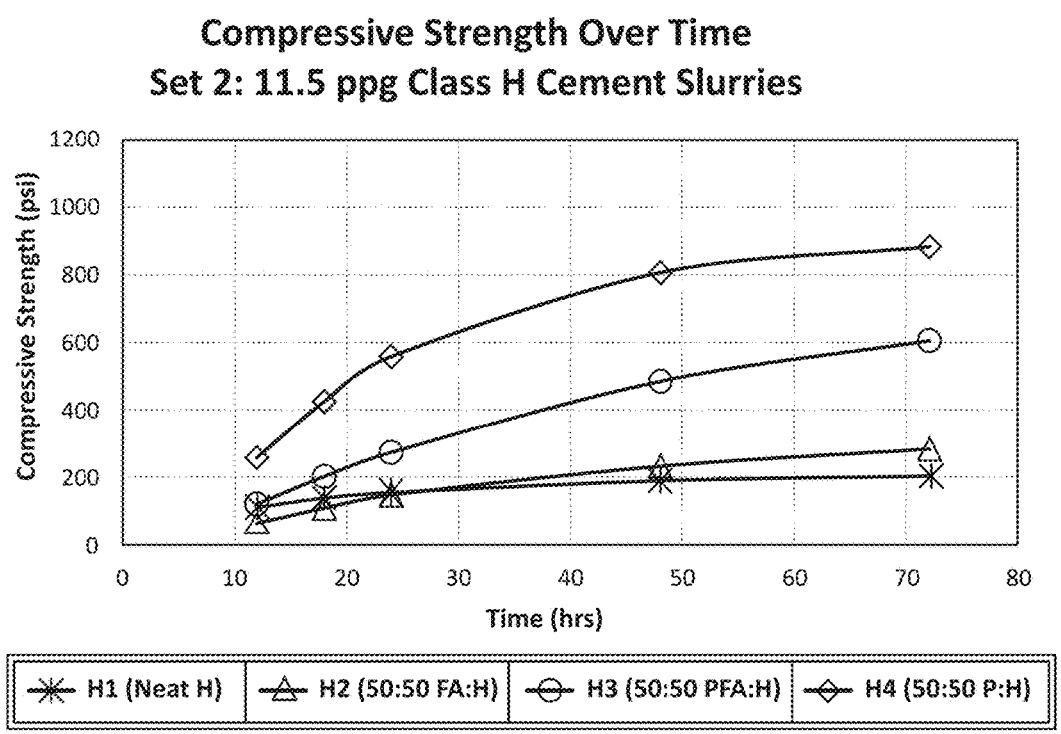
Figure 6:
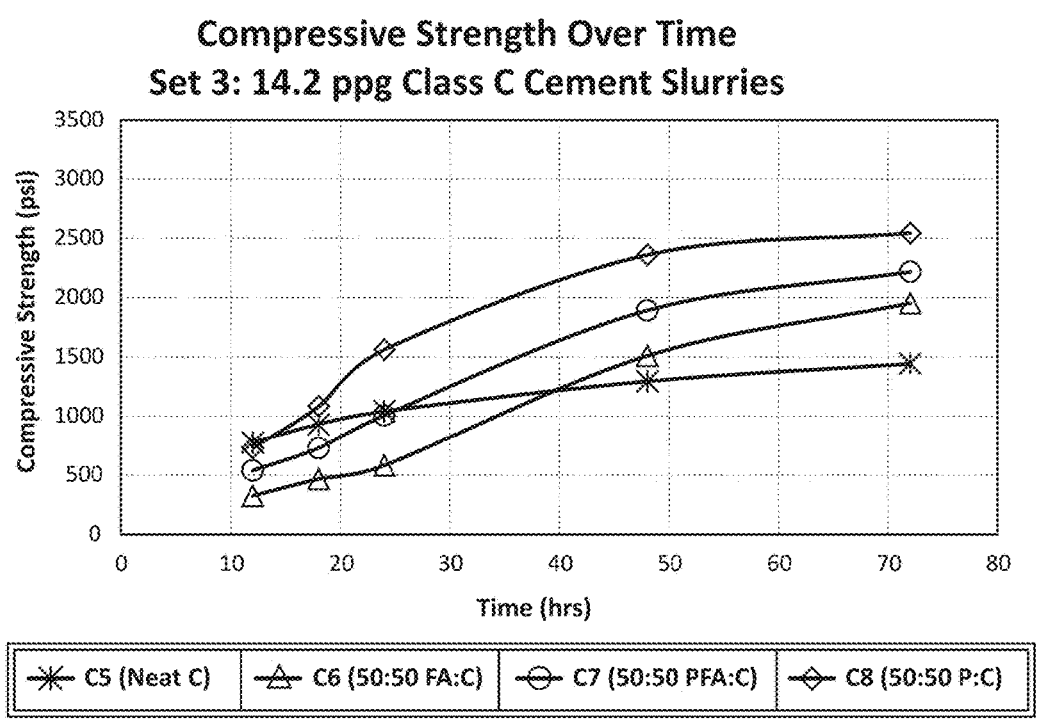
Figure 7:
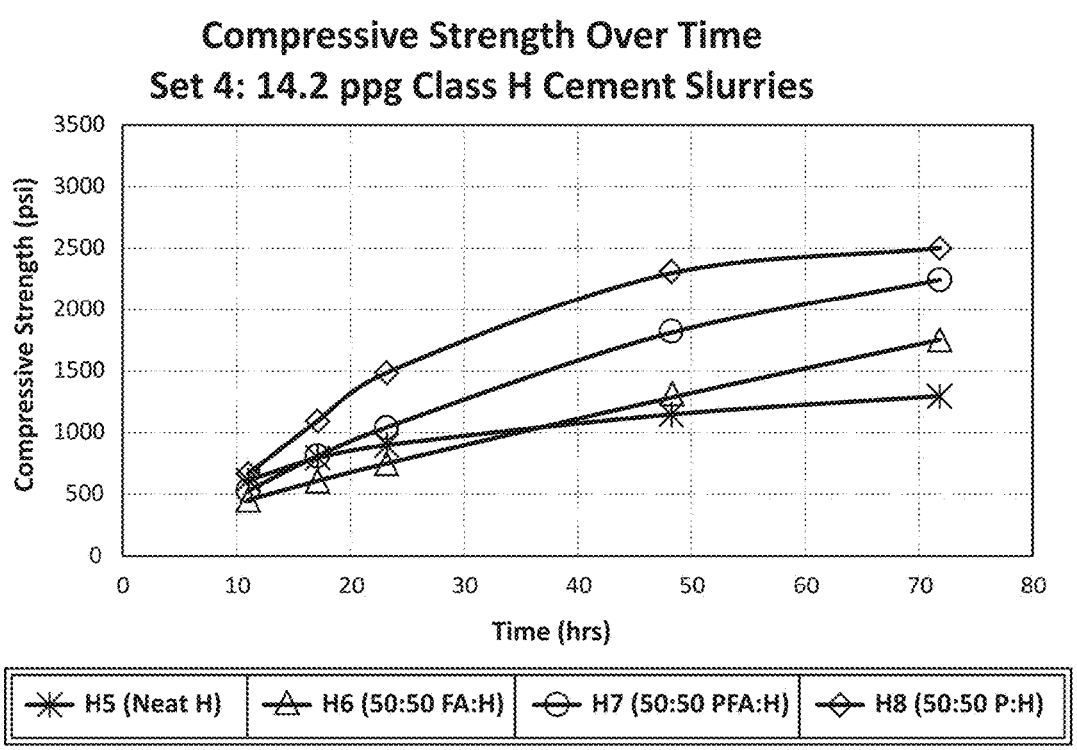
Figure 8:
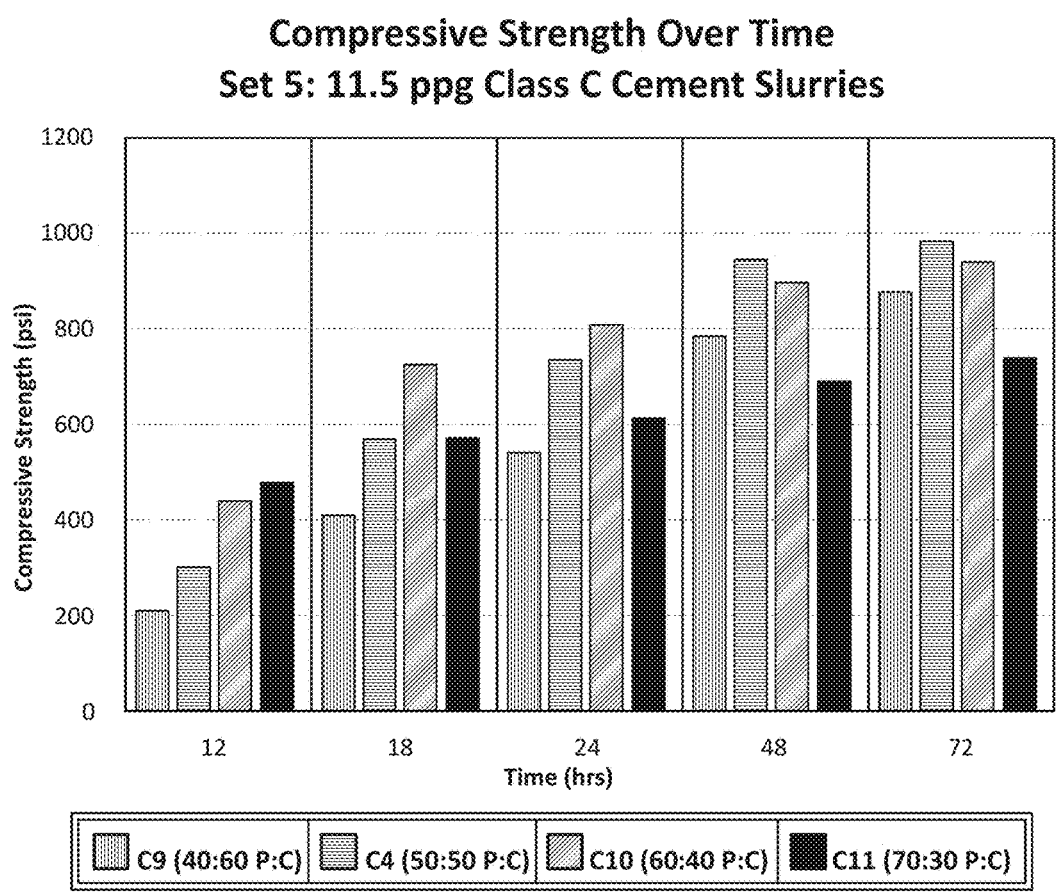
FIGS. 8-11 are graphical presentations of data collected in Example 2 showing the UCA compressive strength of test slurries over time as they cured.
Figure 9:
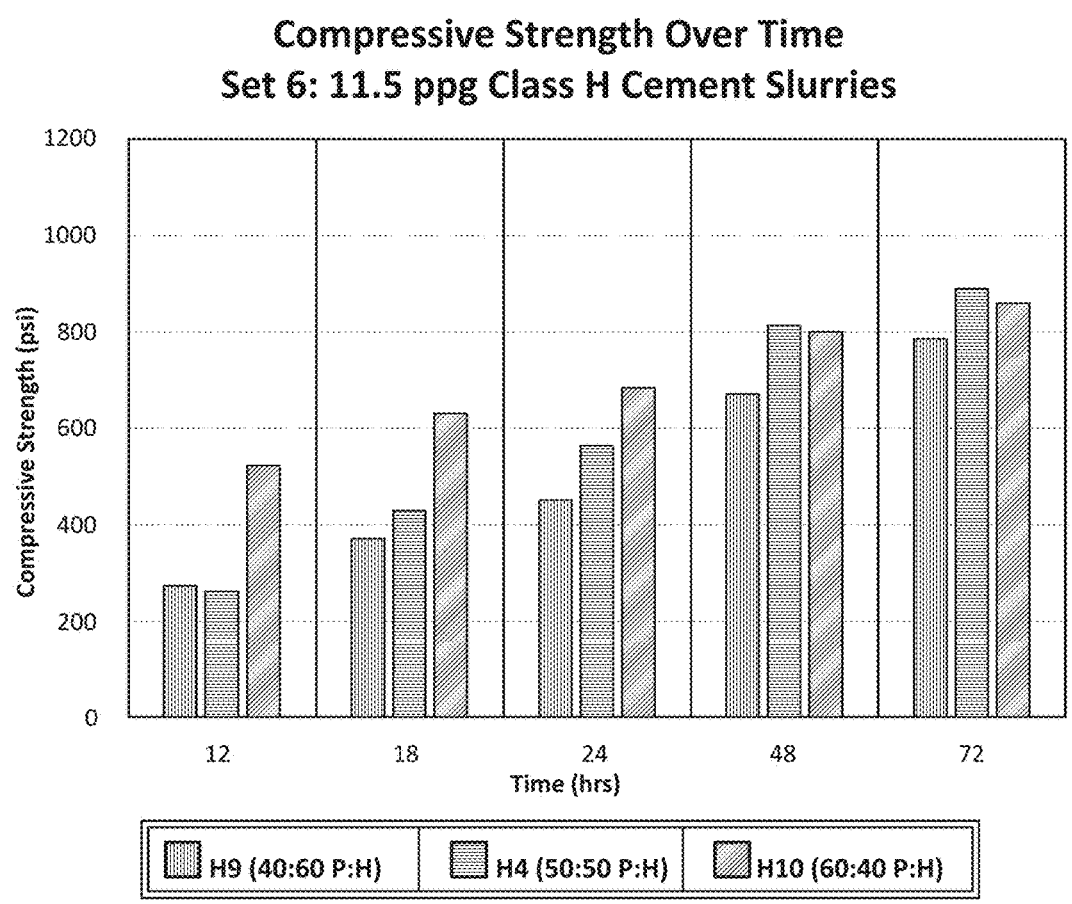
Figure 10:
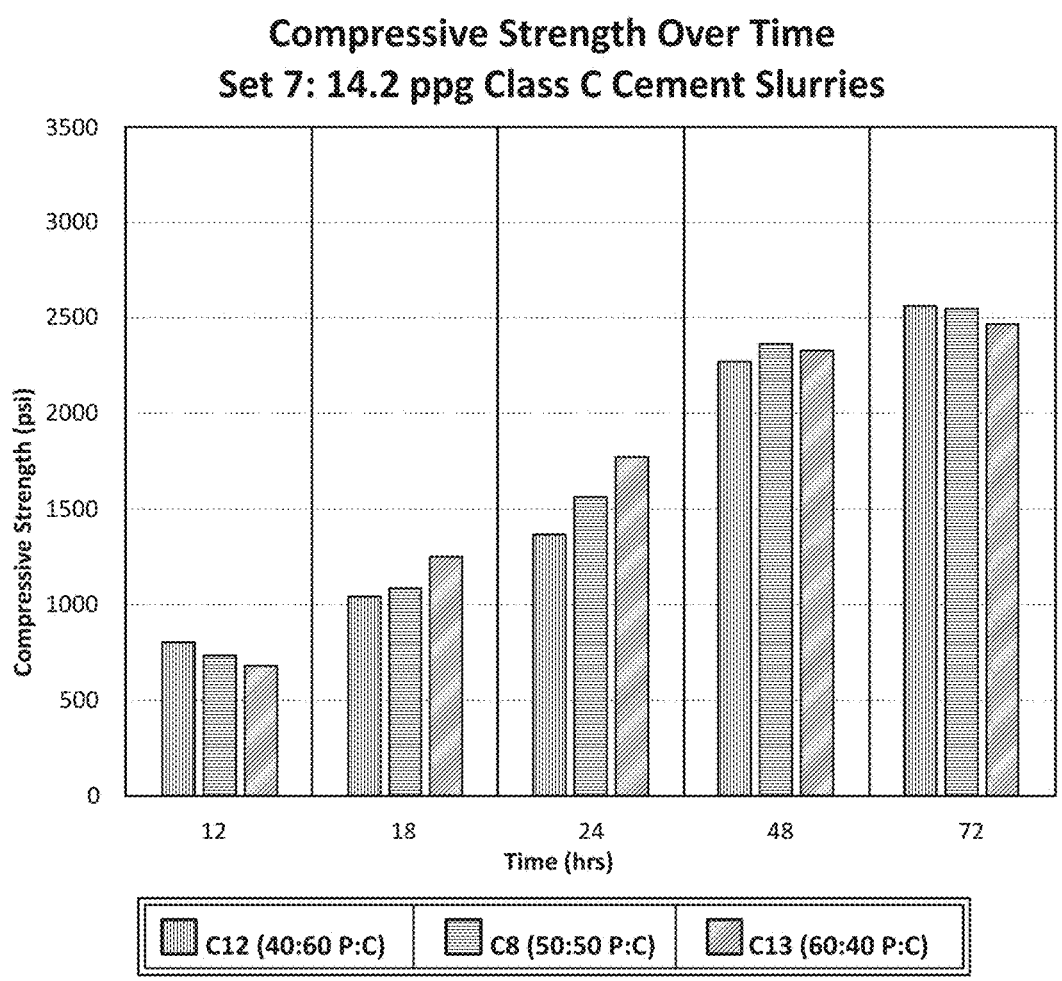
Figure 11:
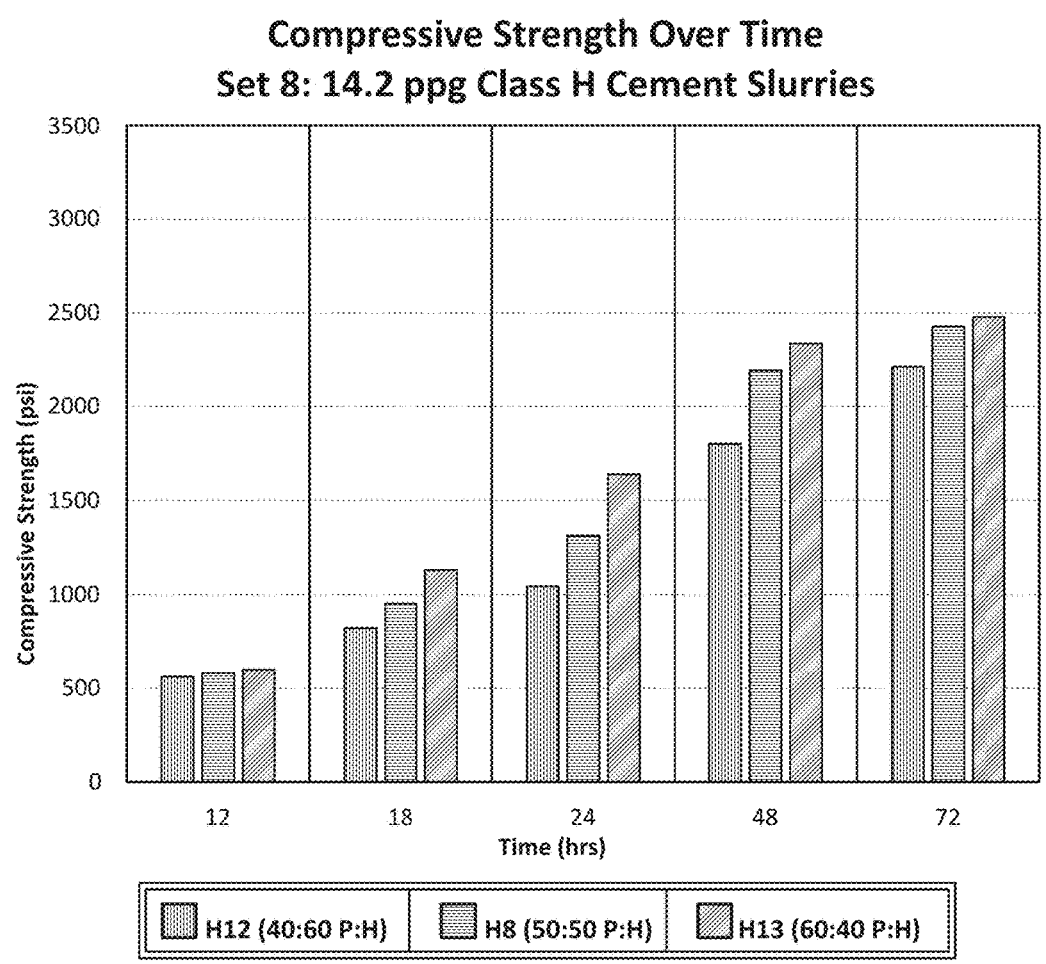

Fly Ash (FA). Class C fly ash obtained from Rock water Energy Solutions, Houston, Tex. The mean particle size was determined to be approximately 16.1 μm, as reported in Table 1 below. Its particle size distribution is presented in the graph of FIG. 2.

Pumice-Fly Ash Mixture (PFA). The pumice-fly ash mixture is believed to be a mixture of pumicite and non-spec fly ash comprising at least about 40 wt % pumice. It has a specific gravity of 2.3 and 90+% will pass a 325-mesh screen. It is certified as a Class F pozzolan under ASTM Standard C618N. It is available commercially under the product name Tephra RFA from CR Minerals. The mean particle size was determined to be approximately 8.741 μm, as reported in Table 1 below. Its particle size distribution is presented in the graph of FIG. 2.

Pumice (P). Pumicite described as "pumicite natural pozzolan" having a specific gravity of 2.3. Certified as a pozzolan under ASTM Standard C618N and available commercially under the product name Tephra NP from CR Minerals. The mean particle size was determined to be approximately 8.13 μm, as reported in Table 1 below. Its particle size distribution is presented in the graph of FIG. 2.

TABLE 1

| | Particle Size Data (μm) | | | | | |
|---|---|---|---|---|---|---|
| Pozzolan | Mean (μm) | <10% (μm) | <25% (μm) | <50% (μm) | <75% (μm) | <90% (μm) |
| FA | 16.09 | 1.060 | 3.264 | 9.675 | 24.63 | 43.12 |
| PFA | 8.744 | 0.873 | 1.820 | 5.734 | 13.85 | 22.13 |
| P | 8.129 | 0.872 | 1.905 | 6.164 | 13.21 | 19.03 |

Suspension Agent 1 (SA1). Bentonite comprising about 90-100% bentonite and about 10-0% crystalline silica (quartz). The bentonite is commercially available as a dried powder from BJ Services, Tomball, Tex., and is typical of bentonite available from other commercial suppliers.

Suspension Agent 2 (SA2). Welan gum (WG) comprising about 35 wt % welan gum and 65 wt % crystalline silica (quartz). The welan gum is commercially available as a dried powder from BJ Services and is typical of welan gums available as dried powders from other commercial suppliers.

Defoamer. A blend of conventional surfactants commercially available as an aqueous solution under the product name FP-6L from BJ Services. Equivalent defoamers are available from other commercial suppliers.

Dispersant. A blend of conventional surfactants commercially available as a tan-colored dried powder from BJ Services. Equivalent dispersants are available from other commercial suppliers.

Retarder. A lignosulfonate-based retarder available as a dried powder from BJ Services. Equivalent retarders are available from other commercial suppliers.

Particle Size Distribution. Particle size and distribution were measured following manufacturer recommended procedures with an LS 13 320 Series laser diffraction particle size analyzer sold by Beckman Coulter, Inc., Indianapolis, Ind. (beckmancoulter.com).

Preparation of Slurries. Test cement slurries were prepared according to procedures set forth in API Recommended Practice 10B (RP 10B) using a Model 3060-110 standard constant speed mixer manufactured by Chandler Engineering (Ametek, Inc.), Broken Arrow, Okla. (chandler-eng.com). Briefly, defoamer was added to tap water and thoroughly mixed in the mixer for 15 seconds at 4,000 rpm. The cement and other dry components were blended and then added to the mixer. The liquid and dry components were then mixed for 15 seconds at 4,000 rpm followed by mixing at 12,000 rpm for 35 seconds to produce a slurry.

Various test slurries were prepared as described above. The density, components, and amounts of each component for each slurry are set forth in the table of FIG. 3. Density is reported in ppg. Component loadings are reported in pozzolan:cement weight ratio, weight percent of the slurry or "blend" ("bwob"), and gal/sk.

Conditioning of Slurries. Test slurries were heated and conditioned in accordance with RP 10B using a Model 1200 atmospheric consistometer sold by Chandler Engineering. The consistometer has a stationary paddle and a rotating sample cup which is disposed in a mineral oil bath for heating samples. The test slurries were heated to the target temperature over the course of 30 minutes and conditioned at that temperature for an additional 30 minutes. All heating and conditioning was done with constant stirring at 150 rpm speed.

Curing of Slurries. Samples of test slurries were cured for evaluation of their compressive and tensile strength. The cured samples were cured in accordance with RP 10B in a Model 7-350-1 pressurized curing chamber sold by Chandler Engineering. Immediately after preparation at room temperature, the test slurry was poured into the reported mold and placed in the curing chamber. The molds were lightly greased to make it easier to remove the sample once cured. The chamber was pressurized to 3,000 psi, and the slurry was allowed to cure.

The slurry first was heated from room temperature to 107° F. over the course of 30 minutes. The slurry was then heated over the course of 210 minutes to a temperature of 123° F. and held there. The samples were cured for a total of 72 hours.

The heating regimen is intended to model the temperature of the slurry as it is circulated into and allowed to cure in the zone to be cemented. The slurry typically will be at lower temperatures as it is circulated into the zone, what is referred to as the bottom hole circulation temperature (BHCT). The slurry typically will experience elevated temperatures once circulation is stopped and it is allowed to set, what is referred to as the bottom hole static temperature (BHST).

Compressive Strength During Curing. The compressive strength of test slurries was measured as they cured as reported in the Examples below. Test slurries were tested in accordance with RP 10B using a Model 900 high-pressure, high-temperature ("HPHT") ultrasonic cement analyzer ("UCA") sold by Chandler Engineering. The UCA provides a continuous, non-destructive method of determining compressive strength as a function of time while simulating downhole temperature and pressure in the wellbore. Pressure is supplied to the UCA by a Quizix™ Q5200 metering pump sold by Chandler Engineering. Test procedures and data acquisition and processing are controlled by a computer running Model 5270 data acquisition and control system software sold by Chandler Engineering. The UCA was calibrated prior to testing using a 3.5-inch calibration bar obtained from Chandler Engineering according to the manufacture's standard calibration procedures.

Immediately after preparation at room temperature, the test slurry was quickly poured to the desired level inside the UCA cup using a standard measuring gauge provided by the manufacturer. The remaining volume above the cement slurry was filled with tap water, and the cup was placed inside the HPHT chamber. The chamber was pressurized to 3,000 psi, and the slurry was heated to the reported BHCT over the course of 30 minutes. The slurry then was heated over the course of 210 minutes to the reported BHST and held there. The slurry was cured for a total of 72 hours.

The UCA transmitted an acoustic signal through the sample as the slurry hardened. The velocity of the signal is related to the strength of the sample and will increase as the slurry hardens. Thus, the transit time of the signal through the sample was recorded over the course of 72 hours. Using a proprietary algorithm, the UCA software calculated and reported the compressive strength of the slurry sample in pounds per square inch (psi) over the 72-hour cure period.

Compressive Strength (Crush Testing). The compressive strength of cured test slurries was measured by crush testing as reported in the Examples below. The cured slurries were crushed using a Model STM-20K screw drive press sold by United Testing Systems Inc., Fullerton, Calif. (unitedtesting.com). Test procedures and data acquisition were controlled by a computer running Datum 4.0 software sold by United Testing Systems.

Test slurries were prepared and cured as described above. The cured sample was prepared using a 2-inch cubic brass mold. Immediately after curing, the cement cube was removed from the mold and placed in the press. The press applied an increasing load at a controlled rate of 4,000 pound-foot/minute to the cement cube until it failed. The compressive load on the cube at failure was recorded.

The compressive strength data over time reported in the Examples below are inferred by UCA measurements of the transit times of an acoustic signal through a test slurry. The data generated by crush testing are a direct measurement of the compressive strength of the cured test slurries and are intended to validate the indirect, inferred data generated by UCA testing.

Tensile Strength. The tensile strength of cured test slurries was measured indirectly by the Brazilian test as reported in the Examples below. The test slurries were crushed according to RP 10B using the same equipment used for crush testing.

Test slurries were prepared and cured as described above. The cured sample was prepared using a 2-inch diameter cylindrical stainless-steel mold. Immediately after curing, the cement cylinder was removed from the mold, trimmed to approximately 1 inch in length, and placed in the press. The press applied an increasing load at a controlled rate of 600 pound-foot/minute through the major axis of the cylindrical sample until it failed. The load on the sample at failure was recorded.

In-Situ Expansion-Shrinkage. The expansion-shrinkage of test slurries as they cured was measured as reported in the Examples below. Test slurries were tested using a test apparatus assembled by applicant using a modified Chandler Engineering 7-700-5 curing chamber and a sacrificial mold. The mold accommodates changes in the volume of the slurry as it is cured. Electromagnetically loaded, linear displacement transducers are placed on the mold to measure that expansion or shrinkage. The apparatus and testing methods are described more fully in applicant's U.S. Pat. No. 6,817, 238 to V. Go Boncan and GOBONCAN, VIRGILO C. et al., *Real-Time Cement Expansion/Shrinkage Testing Under Downhole Conditions far Enhanced Annular Isolation* (SPE/IADC 79911) (2003).

Immediately after preparation at room temperature, test slurry was poured into the expansion/contraction mold and placed in the curing chamber. The chamber was pressurized to 3,000 psi, and the slurry was heated to a BHCT of 107° F. over the course of 30 minutes. The slurry then was heated over the course of 210 minutes to a BHST of 123° F. and held there at the same pressure. The slurry was cured for a total of from about 140 to about 170 hours. Changes in the volume of the sample were measured periodically and recorded.

Water Permeability. The water permeability of cured test slurries was measured as reported in the Examples below. Water permeability was measured in accordance with standard laboratory procedure using a Hassler-style core holder and a Model 260D syringe pump sold by Teledyne Isco, Lincoln, Nebr. (teledyneisco.com).

Test slurries were prepared and cured as described above. The cured sample was prepared using a 1-inch diameter cylindrical brass mold. Immediately after curing, the cement cylinder was removed carefully from the mold and mounted in the core holder. A confining pressure was applied to the holder and deionized water was injected into the sample using the Teledyne syringe pump. The injection pressure was introduced in 500 psi increments up to 2,000 psi. The confining pressure generally was twice that of the injection pressure up to a maximum of 3,000 psi. The sample was maintained at room temperature during injection.

The water flow through the sample was monitored and recorded by observing the volume change in the pump pipette. A coloring dye was added to the water inside the pipette to improve its visibility. The permeability of water through the cement sample was calculated based on Darcy's law using the formula:

$$K(\text{permeability}) = \{(14{,}700 \; \mu L)/(\Delta PA)\} Q$$

where K is permeability in millidarcys (mD), µ is the viscosity in centipoise (cP), L is the sample length in centimeters (cm), ΔP is differential pressure in psi, A is the area of the cylinder ends in square centimeters (cm$^2$), and Q is flow rate in cubic centimeters per second (cc/sec). The constant of 14,700 is used in the formula to convert the units from atmospheres (atm) to psi and darcys (D) to millidarcys.

Viscosity Over Shear Rate. The viscosity of test slurries at various shear rates was measured as reported in the Examples below. The test slurries were tested using a Model M3600 automatic viscometer sold by Grace Instrument, Katy, Tex. The viscometer is a concentric cylinder viscometer using a rotating sleeve and a stationary bob equipped with a heated sample cup and thermocouple. The sleeve was an R1 rotor with a radius of 1.8415 cm. The bob was a B1 bob having a radius of 1.7245 cm and a height of 3.80 cm. Test procedures and data acquisition are controlled by a computer running Grace M3600DAQ™ software. The viscometer was calibrated prior to testing using a test slurry having a viscosity of 200 centipoise obtained from Grace Instruments according to the manufacture's standard calibration procedures.

Immediately after preparation at room temperature, approximately 200-210 ml of test slurry was added to the sample cup, filling the sample cup to a level a few inches above the top of the bob. The slurries were tested at room temperature at ambient pressure and at various shear rates. The shear rates started at 3 rpm, and then were raised to 6 rpm, 30 rpm, 60 rpm, 100 rpm, 200 rpm, and 300 rpm. The shear rate was held steady at each level for approximately 10 seconds before adjusting the rate upward. Once the maximum shear rate of 300 rpm was reached, the shear rate was decreased through those same shear rates, holding the shear rate steady at each level for approximately 10 seconds. Shear rates were controlled automatically by the Grace viscometer. Viscosity was recorded at the end of each 10 second hold interval. Because the Grace viscometer is "direct-indicating," viscosity was recorded in widely utilized Fann 35 dial readings ("FDR").

Free Fluid Tests. Water bleeding from test slurries was measured as reported in the Examples below. The free fluid tests were performed in accordance with RP 10B at ambient pressures by first heating and conditioning the slurries in the Chandler Engineering 1200 consistometer at the reported temperatures as described above. After conditioning, 250 ml of slurry was transferred immediately into a pre-heated, 250-ml graduated cylinder. The mouth of the cylinder was double-sealed with latex (cut from a latex glove) and aluminum foil to avoid evaporation of water in the slurry. The cylinder then was placed at the reported angle (either 90° or 45°) in a preheated oven on a static, stable pad. The oven was maintained at the specified temperature for a period of 2 hours. The slurry in the cylinder then was visually inspected and any free water at the top of the slurry was measured and recorded.

Fluid Loss Tests. Fluid loss from test slurries was measured as reported in the Examples below. Test slurries were tested in accordance with RP 10B using an Ofite® 170-004S HTHP filter press sold by OFI Testing Equipment, Inc., Houston, Tex. (ofite.com).

Test slurries were prepared and conditioned at or near the reported temperature as described above. The slurry was transferred immediately onto a 325-mesh screen inside a HTHP cell. The cell was pressurized to 1,000 psi, and a differential pressure of approximately 1,000 psi was applied to the slurry at the reported temperature. Filtrate from the slurry was collected in a graduated cylinder placed at the bottom of the cell.

Filtrate was collected for 30 minutes, measured, and recorded. In the event of blowout, the time of blowout and amount of filtrate was recorded.

Thickening Time Test. The thickening time of test slurries was measured as reported in the Examples below. The test slurries were tested in accordance with RP 10B using a Model 7222 HPHT consistometer sold by Chandler Engineering. The consistometer has a rotating sample cup and a stationary paddle. Test procedures and data acquisition and processing are controlled by a computer running the Chandler Engineering 5270 software.

Immediately after preparation at room temperature, the test slurry was poured into the sample cup and placed in the consistometer HPHT chamber. The chamber was heated to the reported temperature and pressurized to 3000 psi over the course of 30 minutes and held there. The sample cup was rotated at a constant rate of 150 rpm.

The voltage required to rotate the sample cup is directly proportional to the torque imparted by the cement to the paddle which in turn is proportional to the consistency of the slurry. The output voltage was recorded, the consistency was calculated, and the cup was rotated until the slurry reached a consistency of 110 Bearden units (Bc). The time required for the slurry to reach a consistency of 70 Bc—a consistency that is generally regarded as the upper threshold for pumping a cement slurry—was reported.

Example 1

The compressive strength of slurries having different pozzolans were evaluated as compared to neat cement. Compressive strength was measured indirectly as they cured using the Chandler Engineering UCA as described above.

Four sets of slurries were evaluated. Each set included four slurries: a slurry of neat cement and three slurries with added pozzolan. The pozzolans were fly ash, the pumice-fly ash mixture, and pumice. All pozzolans were added to the slurry in a 50:50 weight ratio to the cement. The slurry sets differed in the class of cement (being either Class C or Class H) and in their density (being either 11.5 ppg or 14.2 ppg). The lower density slurries were cured at higher temperatures. The slurry sets were as follows:

Set 1: Slurries C1, C2, C3, and C4. All slurries had Class C cement and a density of 11.5 ppg. All slurries were cured at a BHCT of 157° F. and a BHST of 157° F.

Set 2: Slurries H1, H2, H3, and H4. The Set 2 slurries were identical to the Set 1 slurries except that they contained Class H cement. That is, all slurries had Class H cement and a density of 11.5 ppg. All slurries were cured at a BHCT of 157° and a BHST of 157° F.

Set 3: Slurries C5, C6, C7, and C8. All slurries had Class C cement and a density of 14.2 ppg. All slurries were cured at a BHCT of 107° F. and a BHST of 123° F.

Set 4: Slurries H5, H6, H7, and H8. The Set 4 slurries were identical to the Set 3 slurries except that they contained Class H cement. That is, all slurries had Class H cement and a density of 14.2 ppg. All slurries were cured at a BHCT of 107° F. and a BHST of 123° F.

The compressive strength data for each set are presented, respectively, in the graphs of FIGS. 4-7, which show compressive strength from 12 hours to 72 hours. Lower psi values indicate a weaker slurry capable of supporting relatively low loads, and higher psi values indicate a stronger slurry capable of supporting relative high loads. As may be seen from the graphs in FIGS. 4-7, the slurries having pozzolans all have significantly greater compressive strength than the respective neat cement slurry. The trend is more pronounced in Class H slurries and in the lower density (11.5 ppg) slurries that were cured at higher temperature.

Neat Cement Slurries. It will be noted that the increase in compressive strength for all neat cement slurries (C1, H1, C5, and H5) tended to level off, or only increase relatively slowly after approximately 24 hours, especially the lower density (11.5 ppg) neat cement slurries.

Cement Slurries with Ash. The slurries containing fly ash (C2, H2, C6, and H5) actually had diminished compressive strength in the first 24 hours as compared to their corresponding neat slurries (C1, H1, C5, and H5). All of the fly ash slurries eventually showed modest increases in compressive strength over the neat slurries. That did not develop, however, until approximately between 30 to 35 hours for the lower density slurries, and until approximately 40 hours for the higher density slurries.

Cement Slurries with Pumice-Fly Ash Mixture. Although somewhat better than the fly ash slurries, the higher density slurries containing the mixture of pumice and fly ash (C7 and H7) also had lower or comparable compressive strength as compared to the neat slurries (C5 and H5) over the first 24 hours. The lower density pumice-fly ash slurries (C3 and H3) showed modest increases in compressive strength over the first 24 hours. All of the pumice-fly ash slurries, however, eventually developed significantly greater compressive strength than their corresponding neat and fly ash slurries beyond 24 hours. The increase is more pronounced at lower density where the slurry is cured at a higher temperature.

Cement Slurries with Pumice. In contrast, the slurries containing pumice and no fly ash (C4, H4, C8, and H8) all showed significantly greater compressive strength over their corresponding neat cement slurries (C1, H1, C5, and H5) during the first 24 hours. The lower density pumice slurries (C4 and H4) developed significantly greater compressive strength as early as 12 hours than the neat, fly-ash, and pumice-fly ash slurries. The increase in compressive strength as compared to their respective neat cement slurries tended to accelerate rapidly from about 24 to about 48 hours, and continued to increase through 72 hours. The higher density pumice slurries (C8 and H8) started to show significant increase in compressive strength at 24 hours and also developed greater compressive strength than the neat, fly-ash, and pumice-fly ash slurries. Note that the lower density slurries (11.5 ppg) were cured at higher temperature than the higher density slurries (14.2 ppg).

The percent increase in compressive strength for each slurry at 72 hours as compared to their corresponding neat cement slurry is compiled in Table 2 below.

TABLE 2

Percent Increase in Compressive Strength with Pozzolan vs. Neat Cement

| Set | Cement | Density (ppg) | Slurry | Pozzolan (50:50 Pozzolan:Cement) | Increase Over Neat |
|---|---|---|---|---|---|
| 1 | Class C | 11.5 | C2 | Fly Ash | 58% |
|   |   |   | C3 | Pumice-Fly Ash | 136% |
|   |   |   | C4 | Pumice | 268% |
| 2 | Class H | 11.5 | H2 | Fly Ash | 39% |
|   |   |   | H3 | Pumice-Fly Ash | 196% |
|   |   |   | H4 | Pumice | 331% |
| 3 | Class C | 14.2 | C6 | Fly Ash | 35% |
|   |   |   | C7 | Pumice-Fly Ash | 53% |
|   |   |   | C8 | Pumice | 76% |
| 4 | Class H | 14.2 | H6 | Fly Ash | 35% |
|   |   |   | H7 | Pumice-Fly Ash | 72% |
|   |   |   | H8 | Pumice | 92% |

It is believed that this testing shows that the slurries having pumice all developed significantly higher compressive strength than the neat slurries or slurries with only fly ash added. That trend was most pronounced in the lower density slurries that were cured at a higher temperature. More importantly, the slurries having pumice tended to have higher early compressive strength, that is, over the first 24 hours. That trend was especially pronounced and of greater significance in the lower density slurries. The higher density slurries all tended to develop early on sufficient compressive strength for drilling ahead, typically regarded as about 500 psi. In the lower density slurries, however, the slurries without pumice did not reach that level during the entire 72-hour cure. In contrast, the slurries with pumice all developed compressive strength of more than 500 psi. The slurries with pumice alone had compressive strength of more than 500 psi within the first 20 hours.

It will be appreciated that early compressive strength may be necessary for meeting certain government regulations. In any event, it may be expected that the improved early compressive strength of the slurries will shorten significantly WOC time and allow drilling operations to resume more quickly.

Example 2

The compressive strength of slurries having different amounts of pumice were evaluated. Compressive strength was measured indirectly during curing by the UCA as in Example 1.

Four sets of slurries were evaluated. Each set included three slurries with differ weight ratios of pumice to cement: either 40:60, 50:50, or 60:40, with the first set (Set 5) also including a ratio of 70:30. The slurry sets differed in the class of cement (being either Class C or Class H) and in their density (being either 11.5 ppg or 14.2 ppg). The lower density slurries were cured at higher temperatures. The slurry sets were as follows:

Set 5: Slurries C9, C4, C10, and C11. Included slurries with the following weight ratios of pumice to cement: 40:60, 50:50, 60:40, and 70:30. All slurries had Class C cement and a density of 11.5 ppg. All slurries were cured at a BHCT of 157° and a BHST of 157° F.

Set 6: Slurries H9, H4, and H10. Included slurries with the following weight ratios of pumice to cement: 40:60, 50:50, and 60:40. The Set 6 slurries did not include a 70:30 slurry, but otherwise were identical to the Set 5 slurries except that they contained. Class H cement. That is, all slurries had Class H cement and a density of 11.5 ppg. All slurries were cured at a BHCT of 157° and a BHST of 157° F.

Set 7: Slurries C12, C8, and C13. Included slurries with the following weight ratios of pumice to cement: 40:60, 50:50, and 60:40. All slurries had Class C cement and a density of 14.2 ppg. All slurries were cured at a BHCT of 107° F. and a BHST of 123° F.

Set 8: Slurries H12, H8, and H13. The Set 8 slurries were identical to the Set 7 slurries except that they contained Class H cement. That is, all slurries had Class H cement and a density of 14.2 ppg. All slurries were cured at a BHCT of 107° F. and a BHST of 123° F.

The compressive strength data for each set are presented, respectively, in the graphs of FIGS. 8-11, which show compressive strength at 12 hours, 18 hours, 24 hours, 48 hours, and 72 hours. As may be seen in those graphs, increasing the proportion of pumice generally increased the compressive strength of the slurry in the first 24 hours. The 60:40, high-pumice slurries (C10, H10, C12, and H12) had the highest early compressive strength. It will be noted that the 70:30 slurry (C11) had the highest compressive strength at 12 hours, but by 24 hours its compressive strength was less than that of the Class C, lower-density 50:50 and 60:40 slurries (C9 and C10).

After developing that early compressive strength, the trend was not as clear, but all slurries developed a sufficiently high cement strength at 72 hours for the given density and curing condition. At 48 and 72 hours, the compressive strength of the 50:50, equal-pumice slurries (C4, H4, C8, and H8) and the 60:40 high-pumice slurries (C10, H10, C13, and H13) tended to have greater compressive strength than the 40:60, low-pumice (C9, H9, C12, and H12) slurries. At 72 hours, however, the 60:40, high-pumice slurries developed about the same or somewhat less compressive strength than their respective 50:50, equal-pumice slurries. It also will be noted that the 70:30 slurry (C11), despite having the greatest compressive strength at 12 hours, had the lowest compressive strength of all Class C, lower-density slurries at 48 and 72 hours.

Example 3

The compressive strength of cured slurries having different pozzolans were evaluated as compared to neat cement. Compressive strength was measured directly by crush testing as described above to validate the indirect measurement of compressive strength by the UCA testing reported in Examples 1 and 2. Two sets of cured slurries were evaluated: Slurry Sets 3 and 4 evaluated in Example 1 above. At least three samples of each cured slurry were tested, and the results averaged.

Figure 12:
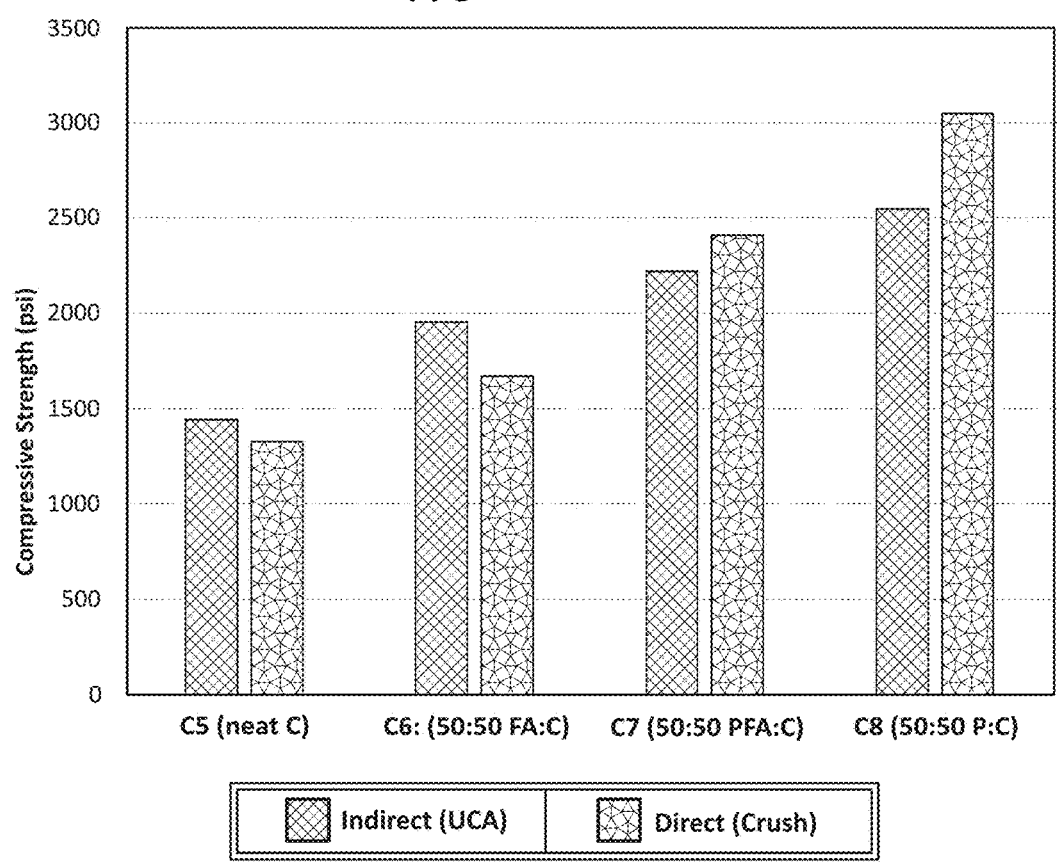
FIGS. 12-13 are graphical presentations of data collected in Example 3 showing the compressive strength of cured test cements as measured by indirect (UCA) and direct methods (crush testing).
Figure 13:
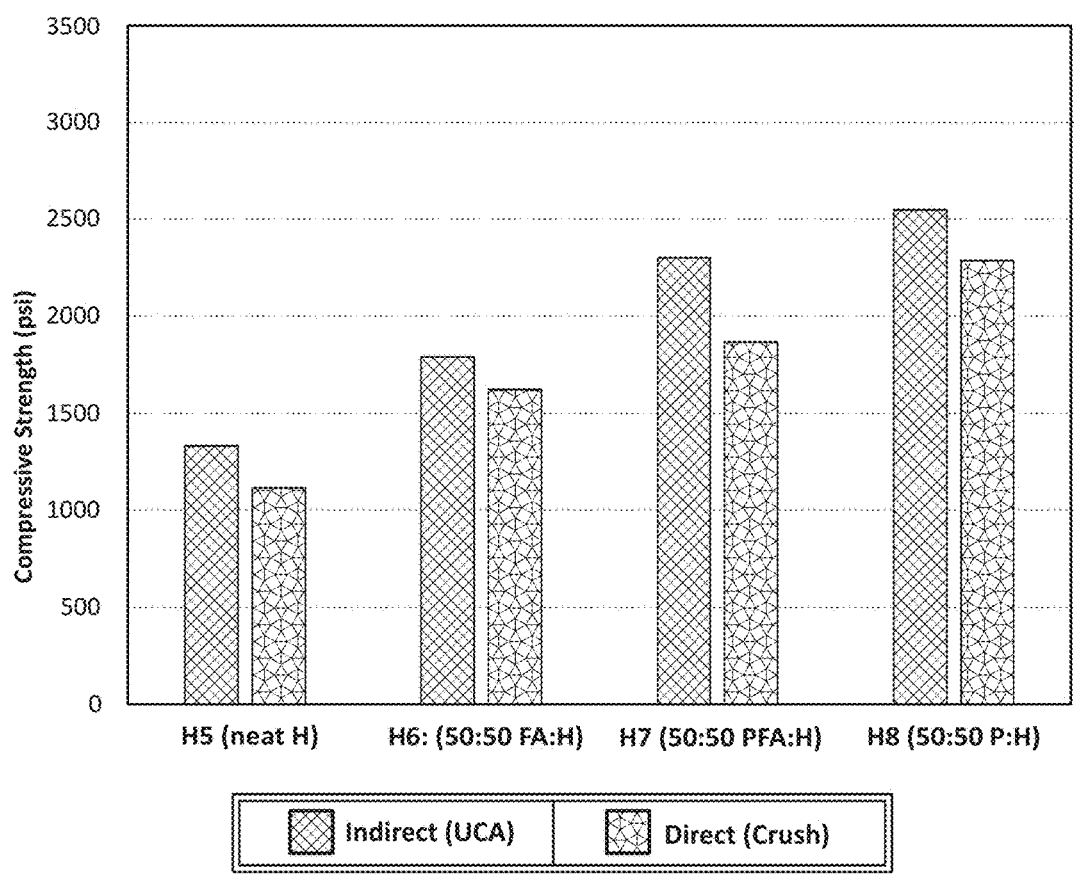

The compressive strength data for each set are presented, respectively, in the graphs of FIGS. 12-13, which show compressive strength at 72 hours. The graphs also report the 72-hour compressive strength of the cured slurries as determined by UCA in Example 1 for comparison. It is believed that the compressive strength data are closely correlated and that the crush test data validate the indirect UCA data reported in Examples 1 and 2. More importantly, the direct and indirect data reported in these Examples for both Class C and H cement show a consistent trend in compressive strength (lowest to highest) as follows: (1) neat cement, (2) fly ash, (3) pumice-fly ash blend, and (4) pumice.

Example 4

The tensile strength of cured slurries having different pozzolans were also evaluated as compared to neat cement. Tensile strength was measured indirectly by the Brazilian method as described above. Two sets of cured slurries were evaluated: Slurry Sets 3 and 4 evaluated in Examples 1 and 3 above. At east three samples of each cured slurry were tested, and the results averaged.

Figure 14:
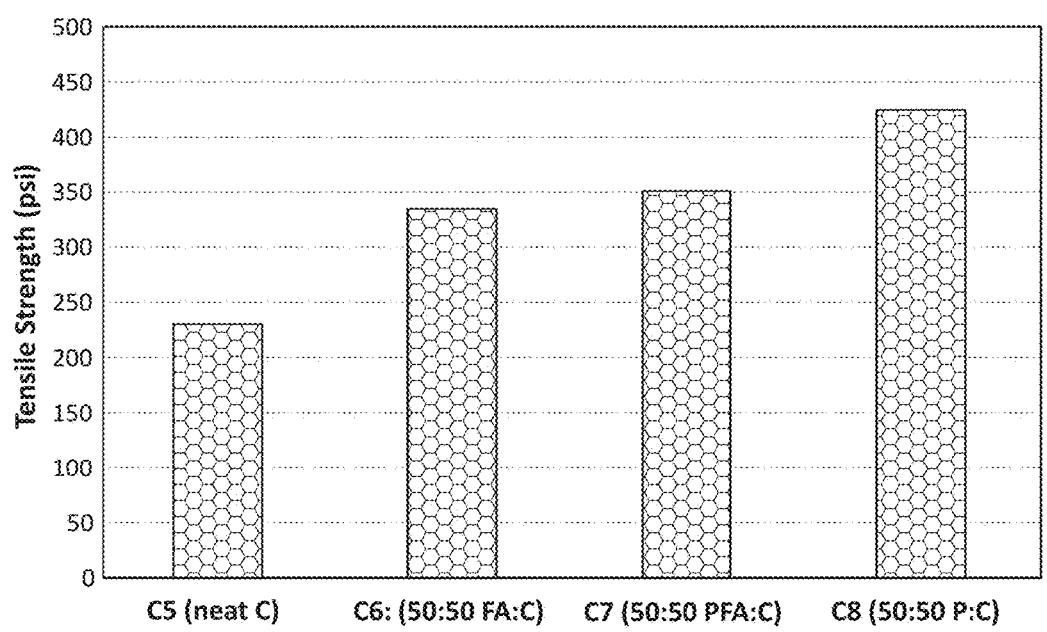
FIGS. 14-15 are graphical presentations of data collected in Example 4 showing the tensile strength of cured test cements.
Figure 15:
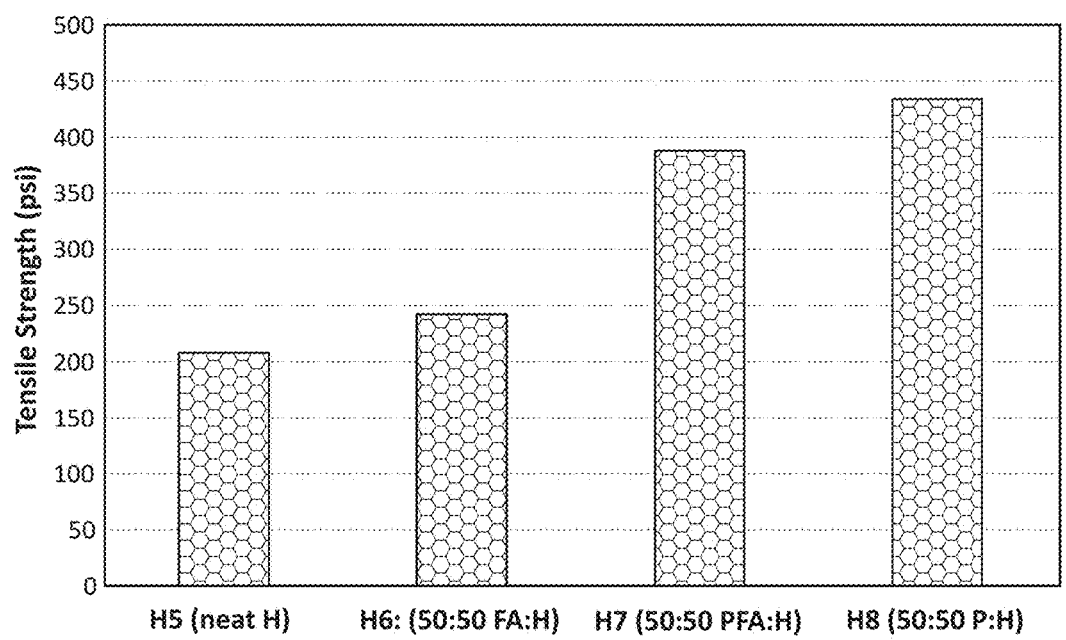

The tensile strength of each cured slurry at 72 hours is presented in the graphs of FIGS. 14-15. As may be seen in that graph, the slurries having 50:50 fly ash (C6 and C6) had greater tensile strength than the neat cement slurry (C5 and H5). The increase was greater for the Class C slurry (C5). The slurries having the pumice-fly ash mixture (C7 and H7), however, all were better than the fly ash slurries. More interesting, the pumice slurries (C8 and H8), which earlier gave the highest compressive strength in Examples 1 and 3, also provided the highest tensile strength.

Example 5

The expansion-shrinkage of slurries having different pozzolans were evaluated as compared to neat cement. Volume changes in the slurry as it cured were measured with applicant's test apparatus as described above. Three slurries were evaluated: C5, C7, and C8*. It should be noted that slurry C8* is identical to slurry C8 evaluated above except that no dispersant was added to slurry C8*.

Figure 16:
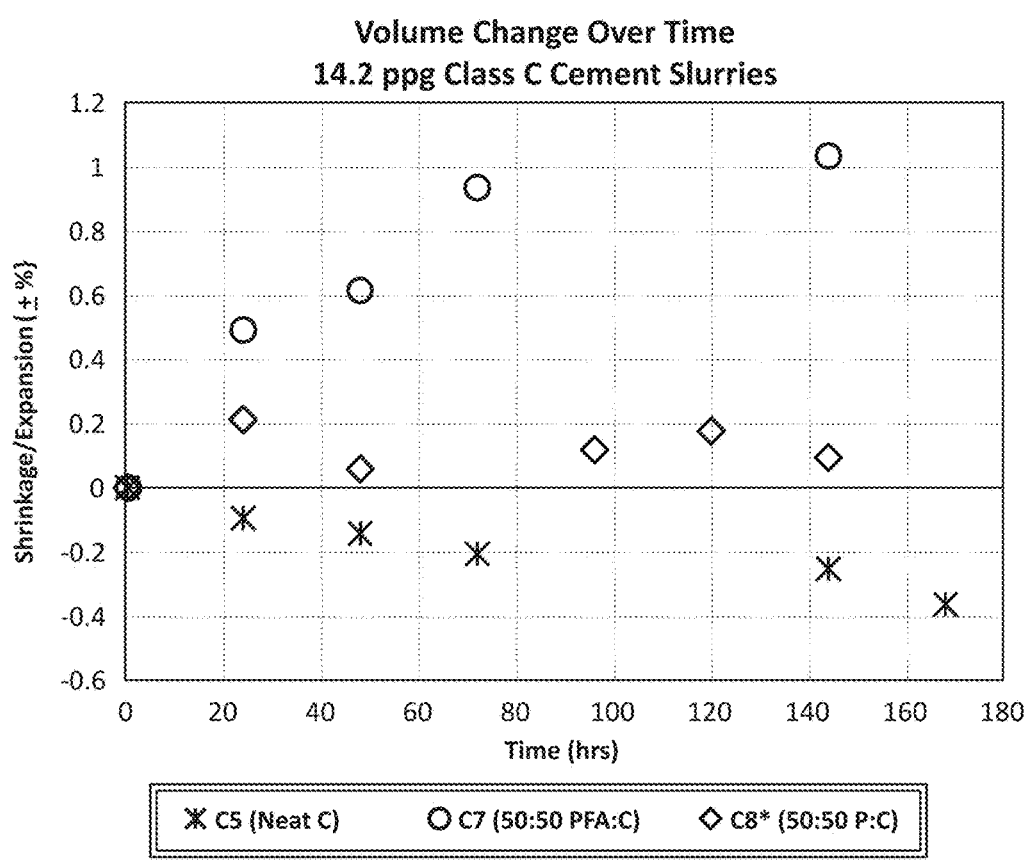
FIG. 16 is a graphical presentation of data collected in Example 5 showing volumetric changes in test slurries over time as they cured.

The percent change in volume of the slurries over time is presented in the graph of FIG. 16, which reports data at various increments over the course of about 7 days. As may be seen in FIG. 16, the neat cement (C5) experienced significant shrinkage as it cured. After about 7 days it had shrunk by about 0.4%. Such shrinkage was expected and can create flow paths for fluids through the sheath. The pumice-fly ash (C7) and pumice (C8) slurries expanded, with the pumice-fly ash slurry showing the greatest expansion (about 1%).

Example 6

The water permeability of cured slurries having different pozzolans was evaluated as compared to neat cement in both Class C and H cements. Water permeability was measured as described above. Two set of cured slurries were evaluated: Slurry Sets 3 and 4 evaluated in Examples 1 and 3 above.

The permeability data are presented in Table 3 below. As may be seen therein, the slurries with added fly ash or pumice all were significantly less permeable than their respective neat cement slurries. The slurries containing pumice alone (C8 and H8), however, provided the lowest water permeability.

Low water permeability provides better isolation of zones in a wellbore. It also will be appreciated that the water permeability of the slurries with pumice alone are extraordinarily low, suggesting that the cured slurries may have significantly longer service life in a well.

TABLE 3

Water Permeability

| Set | Cement | Density (ppg) | Slurry | Pozzolan (50:50 Pozzolan:Cement) | Avg. Permeability (mD) |
|---|---|---|---|---|---|
| 3 | Class C | 14.2 | C5 | Neat | 0.00890 |
|   |   |   | C6 | Fly Ash | 0.00021 |
|   |   |   | C7 | Pumice-Fly Ash | 0.00017 |
|   |   |   | C8 | Pumice | 0.00007 |
| 4 | Class H | 14.2 | H5 | Neat | 0.03176 |
|   |   |   | H6 | Fly Ash | 0.00044 |
|   |   |   | H7 | Pumice-Fly Ash | 0.00006 |
|   |   |   | H8 | Pumice | 0.00007 |

Example 7

The viscosity of slurries having different pozzolans was evaluated as compared to neat cement. Viscosity was measured at different shear rates as described above. Two sets of slurries were evaluated: Slurry Set 1 and Slurry Set 4 which were tested, inter alia, in Example 1. The viscosity data from that testing are set forth in the tables of FIGS. 17-18.

It will be appreciated that the slurries having pumice (C3, C4, H7, and H8) had significantly better viscosities than the corresponding neat slurries (C1 and H5) and were better than the slurries with fly ash alone (C2 and H6). It is expected, therefore, that the pumice slurries will be more stable during pumping. For instance, the slurries having pumice will provide better suspension of cement and other solid particulates in the mixture especially for the low-density slurries. The stability of those slurries is verified with the extended free fluid testing that is reported in Example 8.

Example 8

The slurries tested in Example 7 above (Slurry Sets 1 and 4) were tested to determine the amount of free water that bled from the slurries as described above. After preparation and conditioning as described above, the slurries of Set 1 were tested at a BHCT of 157° F. and with the cylinder upright (at 90°). The slurries of Set 4 were tested at a BHCT of 107° F. and with the cylinder tilted at 45°.

The free fluid measurements for the slurries are reported below in Table 4.

TABLE 4

Free Fluid

| Set | Cement | Density (ppg) | Slurry | Pozzolan (50:50 Pozzolan:Cement) | Free Fluid (%) |
|---|---|---|---|---|---|
| 1 | Class C | 11.5 | C1 | Neat | 2.8 |
|   |   |   | C2 | Fly Ash | 0.8 |
|   |   |   | C3 | Pumice-Fly Ash | 0.8 |
|   |   |   | C4 | Pumice | 1.2 |
| 4 | Class H | 14.2 | H5 | Neat | 2.4 |
|   |   |   | H6 | Fly Ash | 1.6 |
|   |   |   | H7 | Pumice-Fly Ash | 1.6 |
|   |   |   | H8 | Pumice | 0.32 |

It will be appreciated that in general cement slurries should have less than about 2% maximum free fluid. The data show that the neat slurries had free fluid above that level. The slurries having pumice (C3, C4, H7, and H8) bled significantly less fluid than the corresponding neat slurries (C1 and H5) and were similar or better than the slurries with fly ash alone (C2 and H6). It is expected, therefore, that the pumice slurries will be more stable during pumping.

Example 9

The slurries tested in Examples 7 and 8 above (Slurry Sets 1 and 4) were tested for fluid loss under 1000 psi differential pressure as described above. After preparation and conditioning as described above, the slurries of Set 1 were tested at a BHCT of 157° F. The slurries of Set 4 were tested at a BHCT of 107° F.

The fluid loss measurements for the slurries are reported below in Table 5.

TABLE 5

Fluid Loss

| Set | Cement | Density (ppg) | Slurry | Pozzolan (50:50 Pozzolan:Cement) | Fluid Loss (cc) |
|---|---|---|---|---|---|
| 1 | Class C | 11.5 | C1 | Neat | 1,070 |
|   |   |   | C2 | Fly Ash | 873 |
|   |   |   | C3 | Pumice-Fly Ash | 804 |
|   |   |   | C4 | Pumice | 771 |
| 4 | Class H | 14.2 | H5 | Neat | 1,476 |
|   |   |   | H6 | Fly Ash | 1,224 |
|   |   |   | H7 | Pumice-Fly Ash | 853 |
|   |   |   | H8 | Pumice | 713 |

It will be appreciated that the slurries all had relatively high fluid losses since they did not incorporate any fluid loss control additives. Fluid loss additives were intentionally left out so that differences in slurry performance could be attributed to the addition of pozzolan. With that in mind, the data show that the slurries having pumice (C3, C4, H7, and H8) had significantly less fluid loss than the corresponding neat slurries (C1 and H5) and were much better than the slurries with fly ash alone (C2 and H6). It is expected, therefore, that the pumice slurries will be less likely to damage formations. The slurries having pumice also may provide cost savings by allowing a reduction in the amount of fluid loss additives mixed into certain slurries.

Example 10

The slurries tested in Examples 7-9 above (Slurry Sets 1 and 4) were tested for thickening time as described above. The slurries of Set 1 were tested at a BHCT of 157° F. The slurries of Set 4 were tested at a BHCT of 107° F.

The thickening time measurements for the slurries are reported below in Table 6.

TABLE 6

| Set | Cement | Density (ppg) | Slurry | Pozzolan (50:50 Pozzolan:Cement) | Thickening Time (HH:MM) |
|---|---|---|---|---|---|
| 1 | Class C | 11.5 | C1 | Neat | 7:31 |
| | | | C2 | Fly Ash | 9:22 |
| | | | C3 | Pumice-Fly Ash | 5:34 |
| | | | C4 | Pumice | 11:05 |
| 4 | Class H | 14.2 | H5 | Neat | 6:38 |
| | | | H6 | Fly Ash | 7:02 |
| | | | H7 | Pumice-Fly Ash | 6:03 |
| | | | H8 | Pumice | 4:35 |

It is strongly believed that the testing as a whole shows that the novel slurries can provide surprising and useful improvements in various properties of both the slurry and the cured cement. The novel slurries have increased early compressive strength as well as increased long term compressive and tensile strengths. As demonstrated at the given experimental conditions, they avoid shrinkage during curing and generate negligible or less free water. Fluid loss also is greatly reduced, and the viscosity of the slurries is better or higher than fly ash and neat cement. Such properties should provide enhanced suspension of cement and other particulates, especially in lower density slurries. They also exhibit dramatically reduced water permeability, suggesting that their service life in a well may be significantly extended, especially in steam injection wells and wells having an acidic environment.

While this invention has been disclosed and discussed primarily in terms of specific embodiments thereof, it is not intended to be limited thereto. Other modifications and embodiments will be apparent to the worker in the art.

What is claimed is:

1. A settable cementitious slurry for use in a subterranean well, said cement slurry comprising cementitious components, said cementitious components consisting essentially of:
   (a) API Class C or Class H Portland cement; and
   (b) a pozzolan selected from the group consisting of pumice and mixtures of pumice and fly ash, wherein pumice is at least about 40 wt % of said pozzolan;
   (c) wherein the weight ratio of said pozzolan to said cement is from about 35:65 to about 70:30; and
   (d) wherein said pozzolan has an average particle size less than about 20 μm.

2. The cement slurry of claim 1, wherein pumice is at least about 50 wt % of said pozzolan.

3. The cement slurry of claim 1, wherein pumice is at least about 60 wt % of said pozzolan.

4. The cement slurry of claim 1, wherein said pozzolan is pumice.

5. The cement slurry of claim 1, wherein said pozzolan has an average particle size from about 5 to about 20 μm.

6. The cement slurry of claim 1, wherein said pozzolan has an average particle size from about 5 to about 10 μm.

7. The cement slurry of claim 1, wherein said pozzolan to cement ratio is from about 40:60 to about 60:40.

8. The cement slurry of claim 1, wherein said pozzolan to cement ratio is from about 50:50 to about 60:40.

9. The cement slurry of claim 1, wherein said cement slurry is substantially free of added lime.

10. The cement slurry of claim 5, wherein said cement slurry is substantially free of added lime.

11. The cement slurry of claim 6, wherein said cement slurry is substantially free of added lime.

12. The cement slurry of claim 1, wherein said cement slurry has a density of from about 10 to about 16 ppg.

13. The cement slurry of claim 1, wherein said cement slurry has a density of from about 11.5 to about 14.5 ppg.

14. The cement slurry of claim 1, wherein said cement slurry further comprises an additive selected from the group consisting of suspension agents, accelerators, retarders, fluid loss additives, dispersants, and free fluid additives.

15. The cement slurry of claim 5, wherein said pozzolan to cement ratio is from about 50:50 to about 60:40.

16. The cement slurry of claim 6, wherein said pozzolan to cement ratio is from about 50:50 to about 60:40.

17. A method of cementing, said method comprising:
   (a) injecting a cement slurry of claim 1 in a subterranean well; and
   (b) allowing said cement slurry to set.

18. A subterranean well, said subterranean well comprising a set cement slurry of claim 1.

19. A method of cementing, said method comprising:
   (a) injecting a cement slurry of claim 5 in a subterranean well; and
   (b) allowing said cement slurry to set.

20. A method of cementing, said method comprising:
   (a) injecting a cement slurry of claim 6 in a subterranean well; and
   (b) allowing said cement slurry to set.

21. A subterranean well, said subterranean well comprising a set cement slurry of claim 5.

22. A subterranean well, said subterranean well comprising a set cement slurry of claim 6.

23. The method of claim 17, wherein said subterranean well is a well for producing hydrocarbons having a liner extending through a well bore and said method comprises injecting said cement slurry into an annulus between said liner and said well bore and allowing said cement slurry to set and form a seal around said liner.

24. The method of claim 19, wherein said subterranean well is a well for producing hydrocarbons having a liner extending through a well bore and said method comprises injecting said cement slurry into an annulus between said liner and said well bore and allowing said cement slurry to set and form a seal around said liner.

25. The method of claim 20, wherein said subterranean well is a well for producing hydrocarbons having a liner extending through a well bore and said method comprises injecting said cement slurry into an annulus between said liner and said well bore and allowing said cement slurry to set and form a seal around said liner.

* * * * *